US010025162B2

(12) United States Patent
Watanabe et al.

(10) Patent No.: US 10,025,162 B2
(45) Date of Patent: Jul. 17, 2018

(54) FOCUS ADJUSTMENT DEVICE FOR CORRECTING AUTOFOCUS OF FOCUS LENS USING CAPTURED IMAGE SIGNAL TO BE RECORDED, METHOD FOR CONTROLLING THE SAME, AND IMAGE CAPTURE APPARATUS

(71) Applicant: CANON KABUSHIKI KAISHA, Tokyo (JP)

(72) Inventors: Yumi Watanabe, Tokyo (JP); Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 14/699,665

(22) Filed: Apr. 29, 2015

(65) Prior Publication Data
US 2015/0316833 A1 Nov. 5, 2015

(30) Foreign Application Priority Data

May 1, 2014 (JP) .................................. 2014-094877
Aug. 22, 2014 (JP) .................................. 2014-169803

(51) Int. Cl.
*G03B 13/36* (2006.01)
*H04N 5/232* (2006.01)
(Continued)

(52) U.S. Cl.
CPC ............... *G03B 13/36* (2013.01); *G02B 7/28* (2013.01); *G02B 7/282* (2013.01); *G02B 7/365* (2013.01);
(Continued)

(58) Field of Classification Search
CPC ............... H04N 5/232; H04N 5/23212; H04N 5/23209; G02B 7/28; G02B 7/282;
(Continued)

(56) References Cited

U.S. PATENT DOCUMENTS 5,589,909 A * 12/1996 Kusaka ............... G02B 7/346
396/128
6,363,220 B1 * 3/2002 Ide ....................... G02B 7/08
348/345
(Continued)

FOREIGN PATENT DOCUMENTS

JP 62-189415 A 8/1987
JP 2000-266988 A 9/2000
(Continued)

OTHER PUBLICATIONS

The above references were cited in an European Search Report dated Jul. 2, 2015, of which is enclosed, that issued in the corresponding European Patent Application No. 15163961.4.
(Continued)

*Primary Examiner* — Twyler Haskins
*Assistant Examiner* — Akshay Trehan
(74) *Attorney, Agent, or Firm* — Cowan, Liebowitz & Latman, P.C.

(57) ABSTRACT

A focus adjustment device obtains a correction value for correcting a result of autofocus, from aberration information regarding at least one of an astigmatism, a chromatic aberration, and a spherical aberration of an imaging optical system, and focus detection information regarding the autofocus. The focus adjustment device then controls a position of a focusing lens that the imaging optical system has, based on a result of the autofocus corrected using the correction value. By correcting the result of the autofocus while considering at least a focus condition of a photographic image, a focus detection error caused by an aberration of the optical system can be accurately corrected.

14 Claims, 20 Drawing Sheets

(51) Int. Cl.
  *G02B 7/36* (2006.01)
  *G03B 17/14* (2006.01)
  *G02B 7/28* (2006.01)
(52) U.S. Cl.
  CPC ......... *G03B 17/14* (2013.01); *H04N 5/23212* (2013.01)
(58) Field of Classification Search
  CPC .......... G02B 7/36; G02B 7/365; G03B 13/36; G03B 17/14
  See application file for complete search history.

(56) References Cited

U.S. PATENT DOCUMENTS

| | | | | |
|---|---|---|---|---|
| 7,260,322 | B2* | 8/2007 | Ide | G03B 17/14 396/71 |
| 9,395,516 | B2* | 7/2016 | Katsunuma | G03B 11/00 |
| 2010/0013947 | A1* | 1/2010 | Oikawa | H04N 5/23212 348/222.1 |
| 2010/0194966 | A1* | 8/2010 | Abe | G02B 7/38 348/345 |
| 2011/0095166 | A1* | 4/2011 | Yoshida | G02B 7/28 250/201.2 |
| 2011/0206359 | A1* | 8/2011 | Nishimura | G03B 3/10 396/111 |
| 2013/0194485 | A1* | 8/2013 | Maruyama | H04N 9/7908 348/345 |
| 2014/0036134 | A1* | 2/2014 | Miyatani | H04N 5/23212 348/345 |

FOREIGN PATENT DOCUMENTS

| | | |
|---|---|---|
| JP | 2003-241282 A | 8/2003 |
| JP | 2004-134867 A | 4/2004 |
| JP | 2007-033653 A | 2/2007 |
| JP | 2009-175184 A | 8/2009 |
| JP | 2010-078810 A | 4/2010 |
| JP | 2010-117679 A | 5/2010 |
| JP | 5087077 B2 | 11/2012 |
| WO | 2009/028181 A1 | 3/2009 |

OTHER PUBLICATIONS

The above foreign patent document was cited in the Sep. 26, 2017 Korean Office Action, of which is enclosed without an English Translation, that issued in Korean Patent Application No. 10-2015-0060191.

* cited by examiner

F I G. 4A
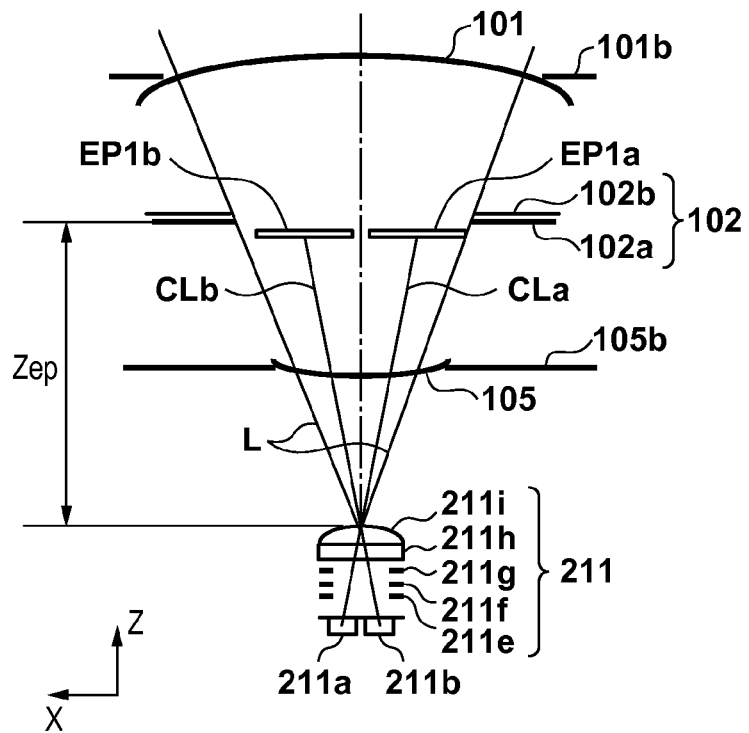
F I G. 4B
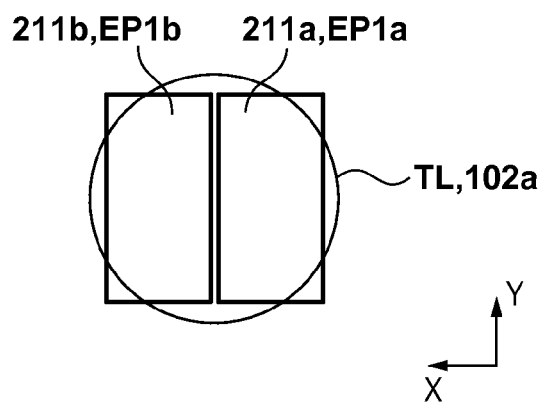

FIG. 9B

| FOCUS LENS POSITION | ZOOM POSITION | | | | | | | |
|---|---|---|---|---|---|---|---|---|
| | 1 | 2 | 3 | 4 | 5 | 6 | 7 | 8 |
| 1 | BP211 | BP212 | BP213 | BP214 | BP215 | BP216 | BP217 | BP218 |
| 2 | BP221 | BP222 | BP223 | BP224 | BP225 | BP226 | BP227 | BP228 |
| 3 | BP231 | BP232 | BP233 | BP234 | BP235 | BP236 | BP237 | BP238 |
| 4 | BP241 | BP242 | BP243 | BP244 | BP245 | BP246 | BP247 | BP248 |
| 5 | BP251 | BP252 | BP253 | BP254 | BP255 | BP256 | BP257 | BP258 |
| 6 | BP261 | BP262 | BP263 | BP264 | BP265 | BP266 | BP267 | BP268 |
| 7 | BP271 | BP272 | BP273 | BP274 | BP275 | BP276 | BP277 | BP278 |
| 8 | BP281 | BP282 | BP283 | BP284 | BP285 | BP286 | BP287 | BP288 |

FIG. 9C

| FOCUS LENS POSITION | ZOOM POSITION | | | | | | | |
|---|---|---|---|---|---|---|---|---|
| | 1 | 2 | 3 | 4 | 5 | 6 | 7 | 8 |
| 1 | BP311 | BP312 | BP313 | BP314 | BP315 | BP316 | BP317 | BP318 |
| 2 | BP321 | BP322 | BP323 | BP324 | BP325 | BP326 | BP327 | BP328 |
| 3 | BP331 | BP332 | BP333 | BP334 | BP335 | BP336 | BP337 | BP338 |
| 4 | BP341 | BP342 | BP343 | BP344 | BP345 | BP346 | BP347 | BP348 |
| 5 | BP351 | BP352 | BP353 | BP354 | BP355 | BP356 | BP357 | BP358 |
| 6 | BP361 | BP362 | BP363 | BP364 | BP365 | BP366 | BP367 | BP368 |
| 7 | BP371 | BP372 | BP373 | BP374 | BP375 | BP376 | BP377 | BP378 |
| 8 | BP381 | BP382 | BP383 | BP384 | BP385 | BP386 | BP387 | BP388 |

FIG. 16A
|  | HORIZONTAL | | | VERTICAL | | |
| --- | --- | --- | --- | --- | --- | --- |
|  | RED | GREEN | BLUE | RED | GREEN | BLUE |
| FOCUS DETECTION | K_AF_RH | K_AF_GH | K_AF_BH | K_AF_RV | K_AF_GV | K_AF_BV |
| PHOTOGRAPHIC IMAGE | K_IMG_RH | K_IMG_GH | K_IMG_BH | K_IMG_RV | K_IMG_GV | K_IMG_BV |
FIG. 16B
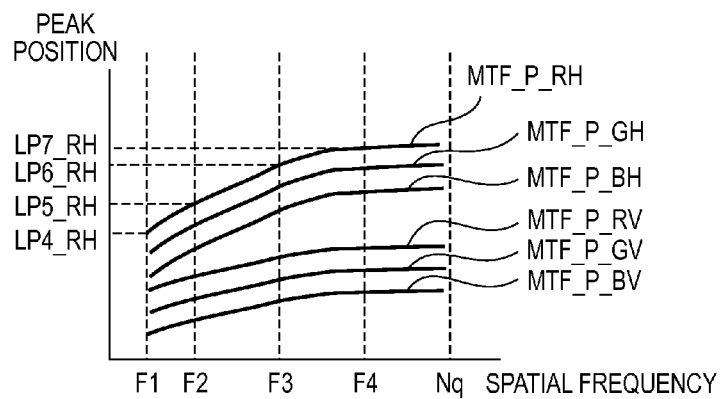
FIG. 16C
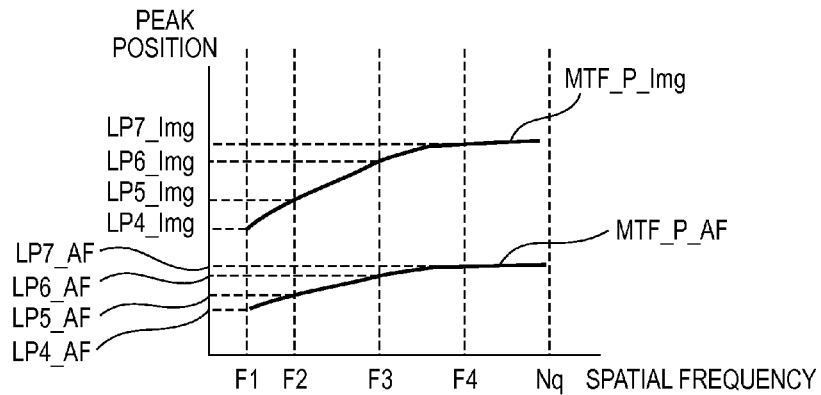

FOCUS ADJUSTMENT DEVICE FOR CORRECTING AUTOFOCUS OF FOCUS LENS USING CAPTURED IMAGE SIGNAL TO BE RECORDED, METHOD FOR CONTROLLING THE SAME, AND IMAGE CAPTURE APPARATUS

BACKGROUND OF THE INVENTION

Field of the Invention

The present invention relates to a focus adjustment device, a method for controlling the focus adjustment device, and an image capture apparatus.

Description of the Related Art

As an autofocus (AF) method of an image capture apparatus, a contrast AF method and a phase-difference AF method are known. Both the contrast AF method and the phase-difference AF method are AF methods that are often used in video cameras and digital still cameras, and in some of these AF methods, an image sensor is used as a focus detection sensor.

In these AF methods, focus detection is performed using an optical image, and accordingly there are cases where an aberration of an optical system that forms the optical image causes an error in a focus detection result. A method for reducing this kind of error has been proposed.

Japanese Patent No. 5087077 (Document 1) discloses a method in which reference correction data defining a combination of a plurality of representative values is prepared for each of an AF frame, a focal length, an AF evaluation frequency, and the distance to a subject, and corrects a focus detection result using correction data obtained by performing interpolation in accordance with an actual condition.

However, with the method in Document 1 that uses a correction value suitable for the AF evaluation frequency unique to a camera body to correct the focus detection result, a problem arises in that a focus detection error cannot be sufficiently corrected. The focus detection error originally is a difference between a focus condition under which an observer feels most favorable with respect to a photographic image and a focus condition indicated by the focus detection result. However, in the method described in Document 1, the focus condition of the photographic image is not considered. Furthermore, there are various factors in the focus detection error, and focus detection errors corresponding to frequencies of respective factors are to be considered. However, this point is not considered in Document 1 either.

SUMMARY OF THE INVENTION

The present invention provides a focus adjustment device, a method for controlling the focus adjustment device, and an image capture apparatus that can accurately correct a focus detection error caused by an aberration of an optical system, by correcting a focus detection result while considering at least a focus condition of a photographic image, and that solve one or more problems in the conventional technique.

According to an aspect of the present invention, there is provided a focus adjustment device capable of executing autofocus by at least one of a phase-difference detection method and a contrast detection method, the device comprising: an obtaining unit configured to obtain a correction value for correcting a result of the autofocus, from aberration information regarding at least one of an astigmatism, a chromatic aberration, and a spherical aberration of an imaging optical system, and focus detection information regarding the autofocus; and a control unit configured to control a position of a focusing lens that the imaging optical system has, based on the result of the autofocus corrected using the correction value.

According to an aspect of the present invention, there is provided a method for controlling a focus adjustment device capable of executing autofocus by at least one of a phase-difference detection method and a contrast detection method, the method comprising: an obtaining step of obtaining a correction value for correcting a result of the autofocus, from aberration information regarding at least one of an astigmatism, a chromatic aberration, and a spherical aberration of an imaging optical system, and focus detection information regarding the autofocus; and a control step of controlling a position of a focusing lens that the imaging optical system has, based on the result of the autofocus corrected using the correction value.

According to an aspect of the present invention, there is provided an image capture apparatus comprising: the focus adjustment device according to the present invention; a camera unit; and a lens unit that includes the imaging optical system and is detachable from the camera unit, wherein the obtaining unit is provided in the camera unit.

According to an aspect of the present invention, there is provided an image capture apparatus comprising: the focus adjustment device according to the present invention; a camera unit; and a lens unit that includes the imaging optical system and is detachable from the camera unit, wherein the obtaining unit is provided in the lens unit.

Further features of the present invention will become apparent from the following description of exemplary embodiments with reference to the attached drawings.

BRIEF DESCRIPTION OF THE DRAWINGS

FIGS. 4A and 4B are diagrams showing a relationship between a photoelectric conversion region and an exit pupil in an embodiment.

FIGS. 9A to 9C are diagrams for illustrating color BP correction value (BP2) calculation processing in an embodiment.

FIGS. 16A to 16C are diagrams for illustrating the BP correction value (BP) calculation processing in the fourth embodiment.

DESCRIPTION OF THE EMBODIMENTS

Preferred embodiments of the present invention will now be described in detail in accordance with the accompanying drawings. Note that, although the embodiments have specific configurations for the purpose of facilitating understanding and description of the present invention, the present invention is not limited to these specific configurations. For example, although a description will be given below of embodiments in which a focus adjustment device and a method for controlling the focus adjustment device according to the present invention are applied to an image capture apparatus, specifically a lens-interchangeable single-lens reflex digital camera, the present invention is also applicable to a digital camera whose lens is not interchangeable, and a video camera. The present invention can also be implemented in any electronic device having a camera, e.g., a mobile phone, a personal computer (laptop, tablet, desktop PC, etc.), a game machine, and the like. Furthermore, the present invention can also be implemented in any device that performs focus adjustment of an optical system.

First Embodiment

Description of Configuration of Image Capture Apparatus—Lens Unit

Figure 2:
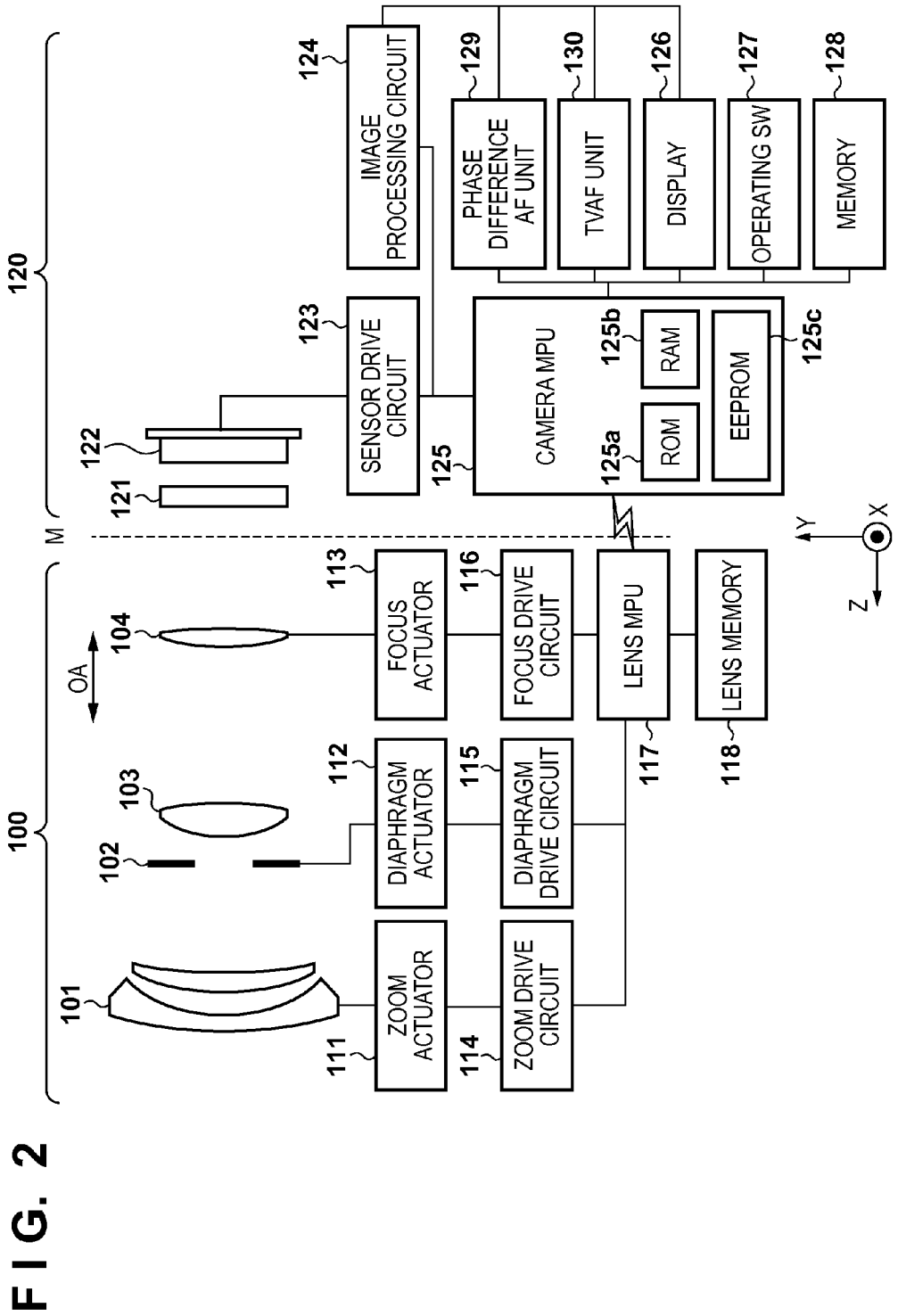
FIG. 2 is a block diagram of a digital camera serving as an exemplary image capture apparatus according to an embodiment.

FIG. 2 is a block diagram showing an exemplary configuration of functions of a digital camera as an example of an image capture apparatus according to an embodiment. The digital camera in the present embodiment is a lens-interchangeable single-lens reflex camera, and has a lens unit 100 and a camera body 120. The lens unit 100 is mounted on a camera body 120 via a mount M denoted by a dotted line at the center of FIG. 2.

The lens unit 100 has an optical system (first lens group 101, diaphragm 102, second lens group 103, and focusing lens group (hereinafter referred to simply as "focusing lens") 104) and a drive/control system. Thus, the lens unit 100 is an imaging lens that includes the focusing lens 104 and forms an optical image of a subject.

The first lens group 101 is arranged at a tip of the lens unit 100, and is held so as to be able to move in an optical axis direction OA. The diaphragm 102 has a function of adjusting the amount of light at the time of imaging, and also functions as a mechanical shutter for controlling exposure time when taking a still image. The diaphragm 102 and the second lens group 103 can integrally move in the optical axis direction OA, and achieve a zoom function by moving in conjunction with the first lens group 101. The focusing lens 104 can also move in the optical axis direction OA, and the subject distance (in-focus distance or focused distance) at which the lens unit 100 focuses changes in accordance with the position of the focusing lens 104. Focus adjustment, i.e., adjustment of the in-focus distance of the lens unit 100 is performed by controlling the position of the focusing lens 104 in the optical axis direction OA.

The drive/control system has a zoom actuator 111, a diaphragm actuator 112, a focus actuator 113, a zoom drive circuit 114, a diaphragm drive circuit 115, a focus drive circuit 116, a lens MPU 117, and a lens memory 118.

The zoom drive circuit 114 drives the first lens group 101 and the third lens group 103 in the optical axis direction OA using the zoom actuator 111, and controls the angle of view of the optical system of the lens unit 100. The diaphragm drive circuit 115 drives the diaphragm 102 using the diaphragm actuator 112, and controls the aperture and opening and closing operations of the diaphragm 102. The focus drive circuit 116 drives the focusing lens 104 in the optical axis direction OA using the focus actuator 113, and controls the in-focus distance of the optical system of the lens unit 100. The focus drive circuit 116 detects the current position of the focusing lens 104 using the focus actuator 113.

The lens MPU (processor) 117 performs all calculation and control relating to the lens unit 100, and controls the zoom drive circuit 114, the diaphragm drive circuit 115, and the focus drive circuit 116. The lens MPU 117 is connected to a camera MPU 125 through the mount M, and communicates commands and data therewith. For example, the lens MPU 117 detects the position of the focusing lens 104, and notifies the camera MPU 125 of lens position information in accordance with a request from the camera MPU 125. This lens position information contains information such as a position of the focusing lens 104 in the optical axis direction OA, the position in the optical axis direction OA and the diameter of an exit pupil in a state where the optical system is not moving, and the position in the optical axis direction OA and the diameter of a lens frame that limits light beams of the exit pupil. The lens MPU 117 also controls the zoom drive circuit 114, the diaphragm drive circuit 115, and the focus drive circuit 116, in accordance with a request from the camera MPU 125. Optical information necessary for autofocus is stored in advance in the lens memory 118. The camera MPU 125 controls operations of the lens unit 100 by executing a program stored in a nonvolatile memory embedded in the camera MPU 125 or the lens memory 118.

Description of Configuration of Image Capture Apparatus—Camera Body

The camera body 120 has an optical system (optical low pass filter 121 and image sensor 122) and a drive/control system. The first lens group 101, the diaphragm 102, the second lens group 103, and the focusing lens 104 in the lens unit 100, and the optical low pass filter 121 in the camera body 120 constitute an imaging optical system.

The optical low pass filter 121 reduces false colors and moiré in a photographic image. The image sensor 122 is constituted by a CMOS image sensor and a peripheral circuit, and has m pixels arranged in the horizontal direction and n pixels arranged in the vertical direction (n and m are integers that are 2 or larger). The image sensor 122 in the present embodiment has a pupil division function, and is capable of the phase-difference AF using image data. An image processing circuit 124 generates, from image data output by the image sensor 122, data for the phase-difference AF and image data for display, recording, and the contrast AF (TVAF).

The drive/control system has a sensor drive circuit 123, the image processing circuit 124, the camera MPU 125, a display 126, an operation switch group 127, a memory 128, a phase-difference AF unit 129, and a TVAF unit 130.

The sensor drive circuit 123 controls operations of the image sensor 122, performs A/D conversion on an obtained image signal, and transmits the converted image signal to the camera MPU 125. The image processing circuit 124 performs image processing that is generally performed in a digital camera, such as γ conversion, white balancing processing, color interpolation processing, and compression coding processing, on the image data obtained by the image sensor 122. The image processing circuit 124 also generates a signal for the phase-difference AF.

The camera MPU (processor) 125 performs all calculation and control relating to the camera body 120, and controls the sensor drive circuit 123, the image processing circuit 124, the display 126, the operation switch group 127, the memory 128, the phase-difference AF unit 129, and the TVAF unit 130. The camera MPU 125 is connected to the lens MPU 117 via a signal line of the mount M, and communicates commands and data with the lens MPU 117. The camera MPU 125 issues, to the lens MPU 117, a request to obtain the lens position, a request to drive the diaphragm, the focusing lens, or zooming at a predetermined drive amount, a request to obtain optical information unique to the lens unit 100, and the like. The camera MPU 125 incorporates a ROM 125a that stores a program for controlling camera operations, a RAM 125b that stores variables, and an EEPROM 125c that stores various parameters.

The display 126 is constituted by an LCD or the like, and displays information regarding imaging modes of the camera, a preview image before imaging, an image for checking after imaging, an in-focus state display image at the time of focus detection, and the like. The operation switch group 127 is constituted by a power switch, a release (imaging trigger) switch, a zoom operation switch, an imaging mode selection switch, and the like. The memory 128 is a removable flash memory and records obtained images.

The phase-difference AF unit 129 performs focus detection processing by a phase-difference detection method, using data for focus detection obtained by the image processing circuit 124. More specifically, the image processing circuit 124 generates, as the data for focus detection, data of a pair of images formed by light beams passing through a pair of pupil regions in the imaging optical system, and the phase-difference AF unit 129 detects a focus shift amount based on a shift amount in the data of the pair of images. Thus, the phase-difference AF unit 129 in the present embodiment performs the phase-difference AF (imaging plane phase-difference AF) based on the output of the image sensor 122, without using a dedicated AF sensor. Operations of the phase-difference AF unit 129 will be described later in detail.

The TVAF unit 130 performs focus detection processing by a contrast detection method, based on an evaluation value for TVAF (contrast information of image data) generated by the image processing circuit 124. In the focus detection processing by the contrast detection method, the focusing lens 104 is moved, and a focusing lens position at which the evaluation value reaches its peak is detected as an in-focus position.

Thus, the digital camera in the present embodiment can execute both the phase-difference AF and the TVAF, and can selectively use them in accordance with a situation, or can use them in combination.

Description of Focus Detection Operation: Phase-Difference AF

Operations of the phase-difference AF unit 129 and the TVAF unit 130 will be further described below.

First, operations of the phase-difference AF unit 129 will be described.

Figure 3A:
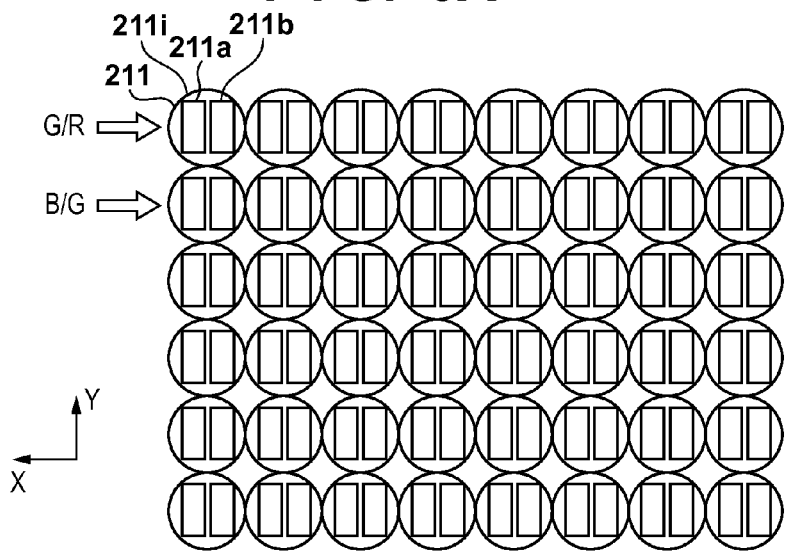
FIGS. 3A and 3B are diagrams showing an exemplary configuration of an image sensor in an embodiment.

FIG. 3A is a diagram showing a pixel array in the image sensor 122 in the present embodiment, and shows a state of an area covering 6 (Y direction) rows in the vertical direction and 8 (X direction) columns in the horizontal directions of a two-dimensional C-MOS area sensor, as observed from the lens unit 100 side. The image sensor 122 is provided with a Bayer pattern color filter, where green (G) and red (R) color filters are alternately arranged in order from left on pixels in an odd-numbered row, and blue (B) and green (G) color filters are alternately arranged in order from left on pixels in an even-numbered row. In a pixel 211, a circle 211i represents an on-chip microlens, and a plurality of rectangles, namely rectangles 211a and 211b arranged within the on-chip microlens are photoelectric conversion units.

In the image sensor 122 in the present embodiment, the photoelectric conversion unit in every pixel is divided into two portions in the X direction, and photoelectric conversion signals of individual photoelectric conversion units and the sum of the photoelectric conversion signals can be independently read out. By subtracting the photoelectric conversion signal of one of the photoelectric conversion units from the sum of the photoelectric conversion signals, a signal corresponding to the photoelectric conversion signal of the other photoelectric conversion unit can be obtained. The photoelectric conversion signals of the individual photoelectric conversion units can be used as the data for the phase-difference AF, and for generating a parallax image that constitutes a 3D (3-Dimensional) image. The sum of the photoelectric conversion signals can be used as usual photographic image data.

A pixel signal in the case of performing the phase-difference AF will now be described. As described later, in the present embodiment, the microlens 211i and divided photoelectric conversion units 211a and 211b in FIG. 3A perform pupil division on exit light beams of the imaging optical system. Regarding a plurality of pixels 211 within a predetermined area arranged in the same pixel row, an image organized by combining outputs of the photoelectric conversion units 211a is set as an AF image A, and an image organized by combining outputs of the photoelectric conversion units 211b is set as an AF image B. Outputs of the photoelectric conversion units 211a and 211b use a pseudo-luminance (Y) signal calculated by adding outputs of green, red, blue, and green that are included in a unit array of the color filter. However, the AF images A and B may be organized for each color of red, blue, and green. By detecting, using correlation calculation, a relative image shift amount between the AF images A and B generated as above, a focus shift amount (defocus amount) in a predetermined area can be detected. In the present embodiment, the output of one of the photoelectric conversion units in each pixel and the sum of the outputs of both photoelectric conversion units in the pixel are read out from the image sensor 122. For example, in the case of reading out the output of the photoelectric conversion unit 211a and the sum of the outputs of the photoelectric conversion units 211a and 211b, the output of the photoelectric conversion unit 211b is obtained by subtracting the output of the photoelectric conversion unit 211a from the sum. Both the AF images A and B can thereby be obtained, achieving the phase-difference AF. Since this kind of image sensor is known as disclosed in Japanese Patent Laid-Open No. 2004-134867, a further description of the details thereof will be omitted.

Figure 3B:
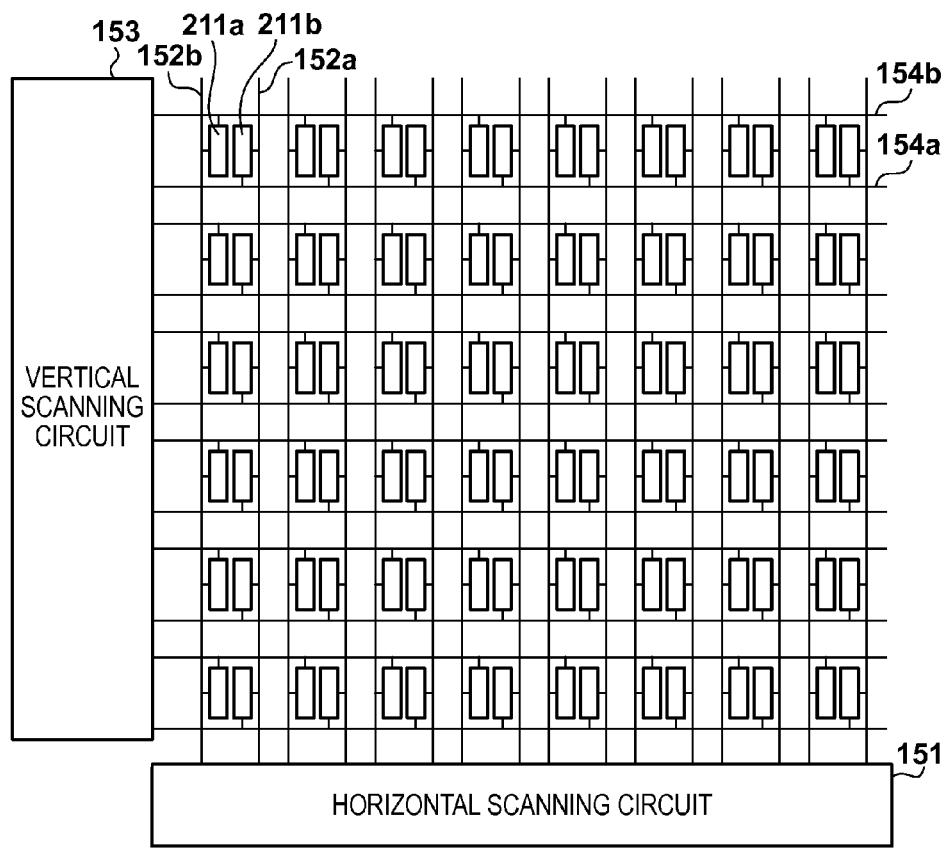

FIG. 3B is a diagram showing an exemplary configuration of a readout circuit of the image sensor 122 in the present embodiment. Reference numeral 151 denotes a horizontal scanning circuit, and reference numeral 153 denotes a vertical scanning circuit. Horizontal scan lines 152a and 152b and vertical scan lines 154a and 154b are arranged at boundary portions of each pixel, and a signal of each photoelectric conversion unit is read out to the outside via these scan lines.

Note that the image sensor in the present embodiment has the following two kinds of readout mode in addition to the above-described method for reading out each pixel. A first readout mode is called an "all-pixel readout mode", which is a mode for capturing a fine still image. In this case, signals of all pixels are read out.

A second readout mode is called a "thinning readout mode", which is a mode for only recording a moving image or displaying a preview image. Since the necessary number of pixels in this case is smaller than the number of all pixels, only pixels in the pixel group that are left after the thinning at a predetermined ratio in both the X and Y directions are read out. The thinning readout mode is also used similarly in the case where high-speed readout is necessary. When thinning pixels in the X direction, signals are added to achieve an improvement in the S/N ratio, and when thinning pixels in the Y direction, signal outputs in thinned rows are ignored. The phase-difference AF and the contrast AF are also usually performed based on signals read out in the second readout mode.

FIGS. 4A and 4B are diagrams illustrating a conjugate relationship between the exit pupil plane of the imaging optical system and the photoelectric conversion units in the image sensor arranged at an image height of 0, i.e., near the center of an image surface in the image capture apparatus in the present embodiment. The photoelectric conversion units in the image sensor and the exit pupil plane of the imaging optical system are designed so as to have a conjugate relationship through the on-chip microlens. In general, the exit pupil of the imaging optical system roughly coincides with a plane on which an iris diaphragm for adjusting the amount of light is placed. On the other hand, the imaging optical system in the present embodiment is a zoom lens having a magnification changing function. Depending on the optical type, the distance of the exit pupil from the image surface or the size of the exit pupil changes when performing a magnification changing operation. FIGS. 4A and 4B show a state where the focal length of the lens unit 100 is at the center between a wide-angle end and a telephoto end. Optimum design of the shape of the on-chip microlens and an eccentricity parameter suitable for the image height (X and Y coordinates) is achieved with the exit pupil distance Zep in this state as a standard value.

In FIG. 4A, reference numeral 101 denotes the first lens group, reference numeral 101b denotes a lens barrel member that holds the first lens group, reference numeral 105 denotes the third lens group, and reference numeral 104b denotes a lens barrel member that holds the focusing lens 104. Reference numeral 102 denotes the diaphragm, reference numeral 102a denotes an aperture plate that defines the aperture when the diaphragm is opened, and reference numeral 102b denotes diaphragm blades for adjusting the aperture when the diaphragm is narrowed. Note that reference numerals 101b, 102a, 102b, and 104b, which work as members for limiting light beams passing through the imaging optical system, denote an optical virtual image as observed from the image surface. A synthetic opening near the diaphragm 102 is defined as the exit pupil of the lens, and the distance thereof from the image surface is Zep, as mentioned above.

The pixel 211 is arranged near the center of the image surface, and will be called a "center pixel" in the present embodiment. The center pixel 211 is constituted, from the lowermost layer, the photoelectric conversion units 211a and 211b, interconnect layers 211e to 211g, a color filter 211h, and the on-chip microlens 211i. The two photoelectric conversion units are projected to the exit pupil plane of the imaging optical system by the on-chip microlens 211i. In other words, the exit pupil of the imaging optical system is projected to a surface of the photoelectric conversion units via the on-chip microlens 211i.

FIG. 4B shows projected images of the photoelectric conversion units on the exit pupil plane of the imaging optical system, and the projected images corresponding to the photoelectric conversion units 211a and 211b are denoted respectively by EP1a and EP1b. In the present embodiment, the image sensor has a pixel from which both an output of one of the two photoelectric conversion units 211a and 211b and the output of the sum of the outputs of both photoelectric conversion units can be obtained. The output of the sum of the outputs from both photoelectric conversion units is obtained by performing photoelectric conversion on light beams that have passed through both areas of the projected images EP1a and EP1b, which roughly cover the entire pupil region of the imaging optical system.

In FIG. 4A, where sign L denotes outermost portions of the light beams passing through the imaging optical system, the light beam L is restricted by the aperture plate 102a of the diaphragm, and vignetting is substantially not generated in the projected images EP1a and EP1b in the imaging optical system. In FIG. 4B, the light beam L in FIG. 4A is denoted by TL. It can be found that vignetting is substantially not generated, also from the fact that most part of the projected images EP1a and EP1b in the photoelectric conversion units is included within the circle denoted by TL. Since the light beam L is limited only by the aperture plate 102a of the diaphragm, TL can be replaced with 102a. At this time, vignetting states of the projected images EP1a and EP1b are symmetrical with respect to the optical axis at the image surface center, and the amounts of light received by the photoelectric conversion units 211a and 211b are equal to each other.

In the case of performing the phase-difference AF, the camera MPU 125 controls the sensor drive circuit 123 so as to read out the aforementioned two kinds of output from the image sensor 122. The camera MPU 125 then gives the image processing circuit 124 information about the focus detection region, and gives the image processing circuit 124 an instruction to generate data of the AF images A and B from the outputs of the pixels included in the focus detection region and supplies the data to the phase-difference AF unit 129. The image processing circuit 124 generates the data of the AF images A and B and outputs the data to the phase-difference AF unit 129 in accordance with the command. The image processing circuit 124 also supplies RAW image data to the TVAF unit 130.

As described above, the image sensor 122 constitutes a part of the focus detection apparatus regarding both the phase-difference AF and the contrast AF.

Note that, although an exemplary configuration has been described here in which the exit pupil is horizontally divided into two portions, some pixels in the image sensor may have a configuration in which the exit pupil is vertically divided into two portions. A configuration is also possible in which the exit pupil is divided both horizontally vertically. As a result of providing a pixel in which the exit pupil is vertically divided, phase-difference AF is enabled that can handle both the horizontal contrast and the vertical contrast of a subject.

(Description of Focus Detection Operation: Contrast AF)

Figure 5:
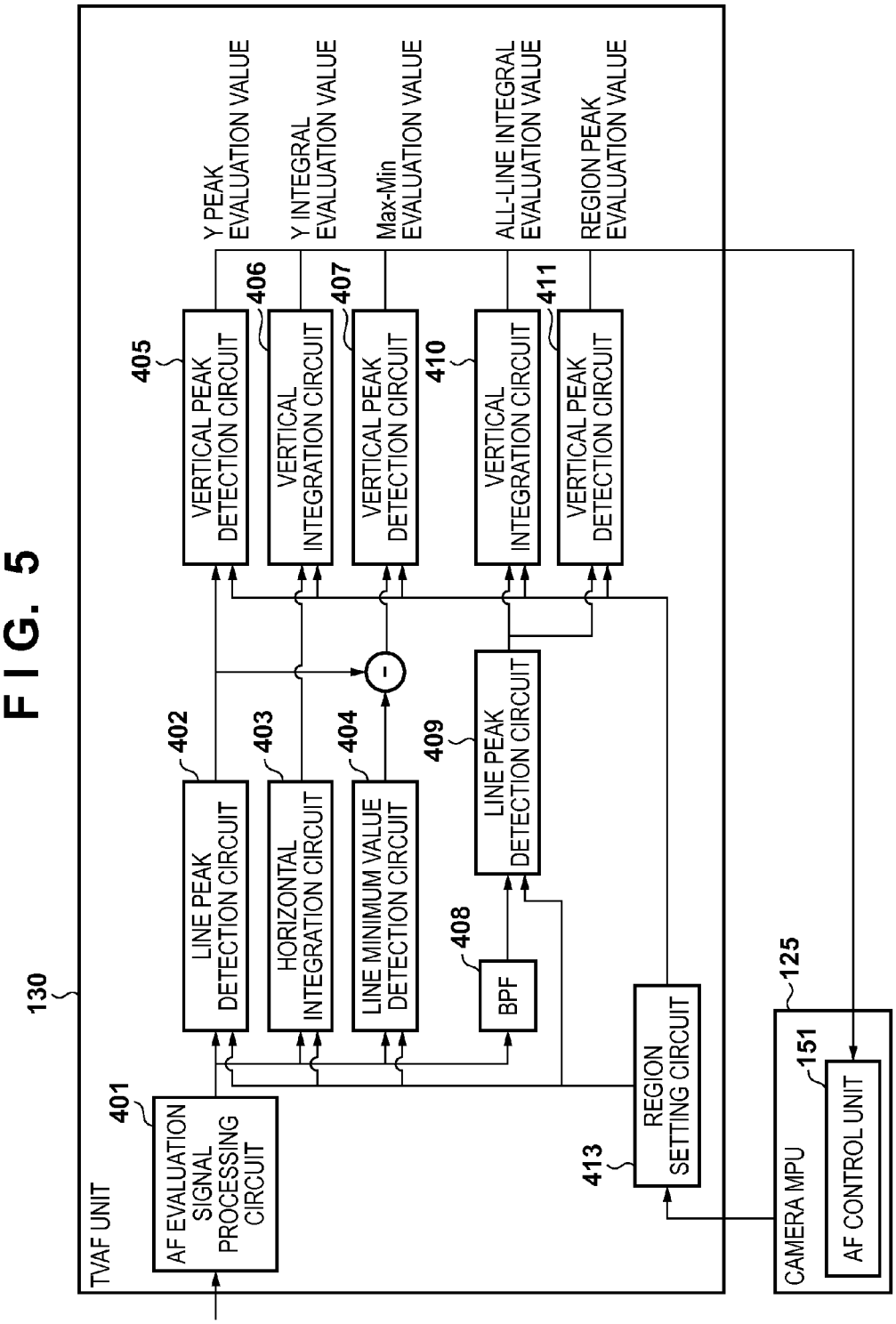
FIG. 5 is a block diagram of a TVAF unit 130 in FIG. 2.

Next, the contrast AF (TVAF) will be described using FIG. 5. The contrast AF is achieved by the camera MPU 125 and the TVAF unit 130 repeatedly performing the driving of the focusing lens and evaluation value calculation in conjunction with each other.

Upon the RAW image data being input from the image processing circuit 124 to the TVAF unit 130, an AF evaluation signal processing circuit 401 extracts a green (G) signal from Bayer pattern signals, and performs gamma correction processing for enhancing low luminance components and suppressing high luminance components. Although the present embodiment will describe a case of performing the TVAF using a green (G) signal, all signals of red (R), blue (B), and green (G) may be used. A luminance (Y) signal may be generated using all RGB colors. In the following description, an output signal generated by the AF evaluation signal processing circuit 401 will be called a "luminance signal Y" regardless of the type of a signal to be used.

Note that it is assumed that the focus detection region is set in a region setting circuit 413 by the camera MPU 125. The region setting circuit 413 generates a gate signal for selecting a signal within the set region. The gate signal is input to a line peak detection circuit 402, a horizontal integration circuit 403, a line minimum value detection circuit 404, a line peak detection circuit 409, vertical integration circuits 406 and 410, and vertical peak detection circuits 405, 407, and 411. Also, a timing of the luminance signal Y being input to each circuit is controlled such that each focus evaluation value is generated with the luminance signal Y within the focus detection region. Note that a plurality of regions can be set in the region setting circuit 413 in accordance with the focus detection region.

A method for calculating a Y peak evaluation value will now be described. The luminance signal Y that has been subjected to gamma correction is input to the line peak detection circuit 402, and a Y line peak value of each horizontal line is obtained within the focus detection region that is set in the region setting circuit 413. A peak of the output of the line peak detection circuit 402 is held in the vertical direction within the focus detection region by the vertical peak detection circuit 405, and a Y peak evaluation value is generated. The Y peak evaluation value is an index that is effective in determination of a high-luminance subject and a low-luminance subject.

A method for calculating a Y integral evaluation value will now be described. The luminance signal Y that has been subjected to gamma correction is input to the horizontal integration circuit 403, and a Y integral value is obtained in each horizontal line within the focus detection region. Furthermore, the output of the horizontal integration circuit 403 is integrated in the vertical direction within the focus detection region by the vertical integration circuit 406, and a Y integral evaluation value is generated. The Y integral evaluation value can be used as an index for determining the brightness of the entire focus detection region.

A method for calculating a Max-Min evaluation value will be described. The luminance signal Y that has been subjected to gamma correction is input to the line peak detection circuit 402, and a Y line peak value of each horizontal line is obtained within the focus detection region. The luminance signal Y that has been subjected to gamma correction is also input to the line minimum value detection circuit 404, and a minimum value of Y is detected in each horizontal line within the focus detection region. The detected line peak value and smallest value of Y in each horizontal line are input to a subtracter, and (line peak value-minimum value) is input to the vertical peak detection circuit 407. The vertical peak detection circuit 407 holds the peak in the vertical direction within the focus detection region, and generates a Max-Min evaluation value. The Max-Min evaluation value is an index that is effective for determination of low contrast and high contrast.

A method for calculating a region peak evaluation value will now be described. By passing the luminance signal Y that has been subjected to gamma correction through a BPF 408, specific frequency components are extracted and a focus signal is generated. This focus signal is input to the line peak detection circuit 409, and a line peak value in each horizontal line is obtained within the focus detection region. The line peak value is held as a peak in the focus detection region by the vertical peak detection circuit 411, and a region peak evaluation value is generated. The region peak evaluation value varies only a little even if a subject moves within the focus detection region, and accordingly is an index that is effective for restart determination, i.e., determination of whether to transition to processing for finding an in-focus point again from an in-focus state.

A method for calculating an all-line integral evaluation value will now be described. As with the region peak evaluation value, the line peak detection circuit 409 obtains a line peak value in each horizontal line within the focus detection region. Next, the line peak detection circuit 409 inputs the line peak value to the vertical integration circuit 410, and integrates, in the vertical direction, the line peak value with respect to the number of all horizontal scan lines within the focus detection region to generate an all-line integral evaluation value. A high-frequency all-line integral evaluation value, which has a wide dynamic range and a high sensitivity due to the effect of integration, is a main AF evaluation value. Accordingly, in the present embodiment, when a "focus evaluation value" is simply recited, it means the all-line integral evaluation value.

The AF control unit 151 in the camera MPU 125 obtains the aforementioned respective focus evaluation values, and moves the focusing lens 104 in a predetermined direction along the optical axis direction by a predetermined amount through the lens MPU 117. The AF control unit 151 then calculates the aforementioned various evaluation values based on a newly obtained image data, and detects a focusing lens position at which the all-line integral evaluation value is largest.

In the present embodiment, various AF evaluation values are calculated in the horizontal line direction and the vertical line direction. Focus detection can thereby be performed with respect to subject contrast information in two perpendicular directions, namely the horizontal and vertical directions.

(Description of Focus Detection Region)

Figure 6:
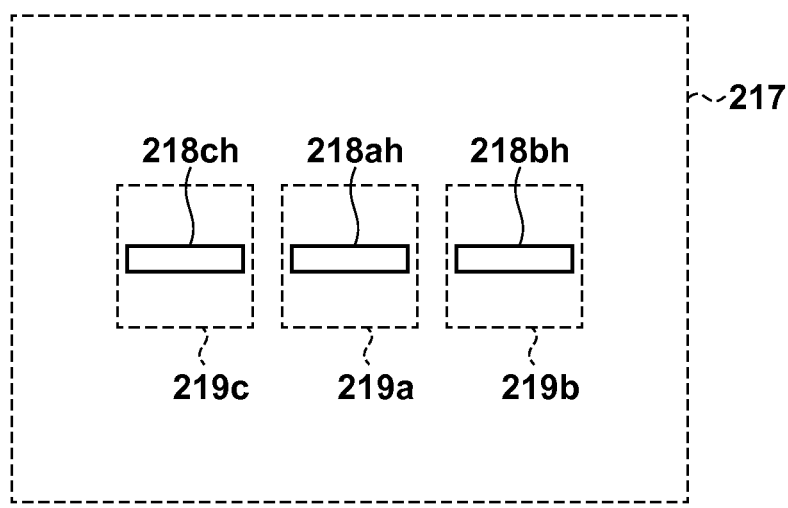
FIG. 6 is a diagram showing exemplary focus detection regions in an embodiment.

FIG. 6 is a diagram showing exemplary focus detection regions within an imaging area. As mentioned above, both the phase-difference AF and the contrast AF are performed based on signals obtained from the pixels included in the focus detection regions. In FIG. 6, a large rectangle denoted by dotted lines is an imaging area 217 in which the pixels of the image sensor 122 are formed. In the imaging area 217, focus detection regions 218*ah*, 218*bh*, and 218*ch* for the phase-difference AF are set. In the present embodiment, the focus detection regions 218*ah*, 218*bh*, and 218*ch* for the phase-difference AF are set at three portions, which are a center portion of the imaging area 217 and two portions respectively on the left and right sides thereof. Also, focus detection regions 219*a*, 219*b*, and 219*c* for the TVAF are set so as to respectively surround focus detection regions 218*ah*, 218*bh*, and 218*ch* for the phase-difference AF. Note that FIG. 6 shows an exemplary setting of the focus detection regions, and the number, position, and size of the focus detection regions are not limited to those shown in FIG. 6.

(Description of Focus Detection Processing Flow)

Next, an autofocus (AF) operation in the digital camera in the present embodiment will be described with reference to FIGS. 1A and 1B.

A description of an outline of AF processing will be given first, and thereafter a detailed description will be given. In the present embodiment, the camera MPU 125 initially applies the phase-difference AF to the focus detection regions 218*ah*, 218*bh*, and 218*ch* to obtain a focus shift amount (defocus amount) of each focus detection region and a reliability of the defocus amount. If a defocus amount having a predetermined reliability is obtained in all of the focus detection regions 218*ah*, 218*bh*, and 218*ch*, the camera MPU 125 moves the focusing lens 104 to an in-focus position of a closest subject, based on the defocus amount.

On the other hand, if a defocus amount having the predetermined reliability is not obtained from any of the focus detection regions, the camera MPU 125 obtains a focus evaluation value with respect to a focus detection region for the contrast AF that includes the focus detection region from which the defocus amount having the predetermined reliability is not obtained. The camera MPU 125 determines whether a subject exists on a closer side with respect to the subject distance corresponding to the defocus amount obtained by the phase-difference AF, based on a relationship between a change of the focus evaluation value and the position of the focusing lens 104. If it is determined that a subject exists on the closer side, the camera MPU 125 drives the focusing lens 104 in a direction based on the change of the focus evaluation value.

Note that, if the focus evaluation value has not been obtained before, the amount of change of the focus evaluation value cannot be obtained. In this case, if a focus detection region exists from which a defocus amount that is larger than a predetermined defocus amount and has the predetermined reliability has been obtained, the camera MPU 125 drives the focusing lens 104 so as to focus on a closest subject in this focus detection region. If a defocus amount having the predetermined reliability has not been obtained, and if a defocus amount larger than the predetermined defocus amount has not been obtained, the camera MPU 125 drives the focusing lens 104 by a predetermined amount which does not relate to the defocus amount. This is because, if the focusing lens 104 is driven based on a small defocus amount, it is highly likely that the change of the focus evaluation value is difficult to detect at the time of next focus detection.

Upon ending focus detection by any of the methods, the camera MPU 125 calculates the various correction values and corrects a focus detection result. The camera MPU 125 then drives the focusing lens 104 based on the focus detection result after the correction.

The details of the above-described AF processing will be described below using flowcharts shown in FIGS. 1A and 1B. The following AF processing operations are executed mainly by the camera MPU 125, except when it is clearly stated that other member performs the operation. When the camera MPU 125 drives or controls the lens unit 100 by transmitting a command or the like to the lens MPU 117, there are cases where it is stated that the camera MPU 125 performs the operation, for the sake of simplification of the description.

In step S1, the camera MPU 125 sets the focus detection regions. It is assumed here that three focus detection regions such as those shown in FIG. 6 are set for the phase-difference AF and the contrast AF.

In step S2, the camera MPU 125 sets a determination flag within the RAM 125*b* to 1.

In step S3, the camera MPU 125 exposes the image sensor 122, reads out image signals, and causes the image processing circuit 124 to generate image signals for the phase-difference AF based on image data within the focus detection regions 218*ah*, 218*bh*, and 218*ch* for the phase-difference AF. The camera MPU 125 also causes the image processing circuit 124 to supply RAW image data generated by the image processing circuit 124 to the TVAF unit 130, and causes the TVAF unit 130 to calculate the evaluation values based on the pixel data within the focus detection regions 219*a*, 219*b*, and 219*c* for the TVAF. Note that, before generating the image signals for the phase-difference AF, processing (see Japanese Patent Laid-Open No. 2010-117679) for correcting asymmetry of the exit pupil caused by vignetting of light beams due to the lens frame of photographic lenses or the like may be applied in the image processing circuit 124. The focus evaluation value calculated by the TVAF unit 130 is stored in the RAM 125*b* in the camera MPU 125.

In step S4, the camera MPU 125 determines whether or not a reliable peak (local maximum value) of the focus evaluation value has been detected. If a reliable peak has been detected, the camera MPU 125 advances the processing to step S20 in order to end the focus detection processing. Note that, although the method for calculating the reliability of the peak of the focus evaluation value is not limited, for example, a method described using FIGS. 10A to 13 in Japanese Patent Laid-Open No. 2010-78810 is available. Specifically, it is determined whether or not a detected peak indicates an apex of a curve, by comparing, with respective threshold values, a difference between the largest value and the smallest value of the focus evaluation value, a length of a portion inclining at an inclination larger than or equal to a fixed value (SlopeThr), and a slope of the inclining portion. If all threshold conditions are satisfied, it can be determined that the peak is reliable.

In the present embodiment, both the phase-difference AF and the contrast AF are used. For this reason, if it has been confirmed that a subject on the closer side exists in the same focus detection region or other focus detection regions, the processing may be advanced to step S5 without ending focus detection even if a reliable focus evaluation value peak is detected. However, in this case, the position of the focusing lens 104 corresponding to the reliable focus evaluation value peak is stored, and the stored position of the focusing lens 104 is used as the focus detection result if a reliable focus detection result is not obtained in the processing in step S5 and subsequent steps.

In step S5, the phase-difference AF unit 129 calculates a shift amount (phase difference) between a pair of image signals supplied from the image processing circuit 124, for each of the focus detection regions 218*ch*, 218*ah*, and 218*bh*, and converts the phase difference into a defocus amount using a conversion coefficient that is stored in advance. Here, determination is also performed on the reliability of the calculated defocus amount, and only the defocus amount of the focus detection region that is determined to have the predetermined reliability is used in subsequent AF processing. The phase difference detected between the pair of image signals contains more errors as the defocus amount is larger, due to the influence of vignetting caused by the lens frame or the like. For this reason, it can be determined that the obtained defocus amount does not have the predetermined reliability (i.e., has a low reliability) in the case where the obtained defocus amount is larger than the threshold value, where the degree of coincidence between the shapes of the pair of image signals is low, or where the contrast of the image signals is low. The case where it is determined that the obtained defocus amount has the predetermined reliability will be expressed below as "the defocus amount can be calculated". The case where the defocus amount cannot be calculated for some reason and the case where it is determined that the reliability of the defocus amount is low will be expressed as "the defocus amount cannot be calculated".

In step S6, the camera MPU 125 checks whether or not the defocus amount can be calculated in all of the focus detection regions 218*ah*, 218*bh*, and 218*ch* for the phase-difference AF that are set in step S1. If the defocus amount can be calculated in all focus detection regions, the camera MPU 125 advances the processing to step S20, and calculates a vertical/horizontal BP correction value (BP1) with respect to a focus detection region in which a defocus amount indicating a subject existing on the closest side is calculated, among the calculated defocus amounts. Here, the reason for selecting the subject on the closest side is because, in general, a subject that a photographer wants to focus on often exists on the closer side. The vertical/horizontal BP correction value (BP1) is a value for correcting a difference in the focus detection result in the case of performing focus detection with respect to horizontal contrast of a subject and the focus detection result in the case of performing focus detection with respect to vertical contrast of a subject.

A general subject has contrast in both the horizontal and vertical directions, and a focus condition of a photographic image is also evaluated while considering the contrast in both the horizontal and vertical directions. On the other hand, when performing the focus detection only in the horizontal direction as in the above-described AF by the phase-difference detection method, an error occurs between a horizontal focus detection result and a focus condition in both the horizontal and vertical directions of a photographic image. This error occurs due to astigmatism or the like in the imaging optical system. The vertical/horizontal BP correction value (BP1) is a correction value for correcting this error, and is calculated while considering the selected focus detection region, the position of the focusing lens 104, the position of the first lens group 101 indicating a zoom state, and the like. The details of the calculation method will be described later.

In step S21, the camera MPU 125 calculates a color BP correction value (BP2) with respect to the focus detection region that is a target of the correction value calculation in step S20, using vertical or horizontal contrast information. The color BP correction value (BP2) is generated by a chromatic aberration in the imaging optical system, and is generated due to a difference between color balance of a signal used in focus detection and color balance of a signal used in a photographic image or a developed image. For example, in the contrast AF in the present embodiment, the focus evaluation value is generated based on the output of a pixel (green pixel) having a green (G) color filter, and therefore an in-focus position of a wavelength of green is mainly detected. However, since the photographic image is generated using all RGB colors, if the in-focus position of red (R) or blue (B) is different from that of green (G) (i.e., an axial chromatic aberration exists), a shift (error) from the focus detection result based on the focus evaluation value occurs. The correction value for correcting this error is the color BP correction value (BP2). The details of the method for calculating the color BP correction value (BP2) will be described later.

In step S22, the camera MPU 125 calculates a specific spatial frequency BP correction value (BP3) with respect to the correction target focus detection region using contrast information of a green signal or the luminance signal Y in the vertical or horizontal direction. The spatial frequency BP correction value (BP3) is generated mainly due to a spherical aberration in the imaging optical system, and is generated due to a difference between an evaluation frequency (band) of a signal used in focus detection and an evaluation frequency (band) at the time of appreciating a photographic image. Since the image signals at the time of focus detection are read out from the image sensor in the second mode as mentioned above, the output signals have been subjected to the addition and the thinning. For this reason, the output signal used in focus detection has a lower evaluation band as compared with a photographic image generated using signals of all pixels that are read out in the first readout mode. The spatial frequency BP correction value (BP3) is for correcting a shift in focus detection generated due to the difference in the evaluation band. The details of the method for calculating the spatial frequency BP correction value (BP3) will be described later.

In step S23, the camera MPU 125 corrects a focus detection result DEF_B in accordance with Equation (1) below using the three calculated correction values (BP1, BP2, BP3), and calculates a focus detection result DEF_A after the correction.

$$DEF\_A = DEF\_B + BP1 + BP2 + BP3 \qquad (1)$$

In the present embodiment, the correction values for correcting the focus detection result are calculated in three steps in the order of "vertical/horizontal" (S20), "color" (S21), and "spatial frequency" (S22).

Initially, an error caused by using contrast information in one direction in focus detection whereas contrast information in both the vertical and horizontal directions is used in evaluation at the time of appreciating a photographic image is calculated as the vertical/horizontal BP correction value (BP1).

Next, the influence of the vertical/horizontal BP is separated, and a difference in the in-focus position between the color of the signal used in the photographic image and the color of the signal used at the time of focus detection in contrast information in one direction is calculated as the color BP correction value (BP2).

Furthermore, in the contrast information in one direction, a difference in the in-focus position generated due to a difference in the evaluation band of a green color or a specific color of the luminance signal or the like between at the time of appreciating a photographic image and at the time of focus detection is calculated as the spatial frequency BP correction value (BP3).

Thus, a reduction in the amount of calculation and a reduction in the volume of data to be stored in the lens or the camera are achieved by separately calculating three kinds of errors.

In step S24, the camera MPU 125 drives the focusing lens 104 through the lens MPU 117, based on the defocus amount DEF_A after the correction calculated using Equation (1).

In step S25, the camera MPU 125 provides a display (AF frame display) indicating the focus detection region in which the defocus amount used in the driving of the focusing lens 104 is calculated, so as to be superimposed on a live view image, for example, on the display 126, and ends the AF processing.

Figure 1A:
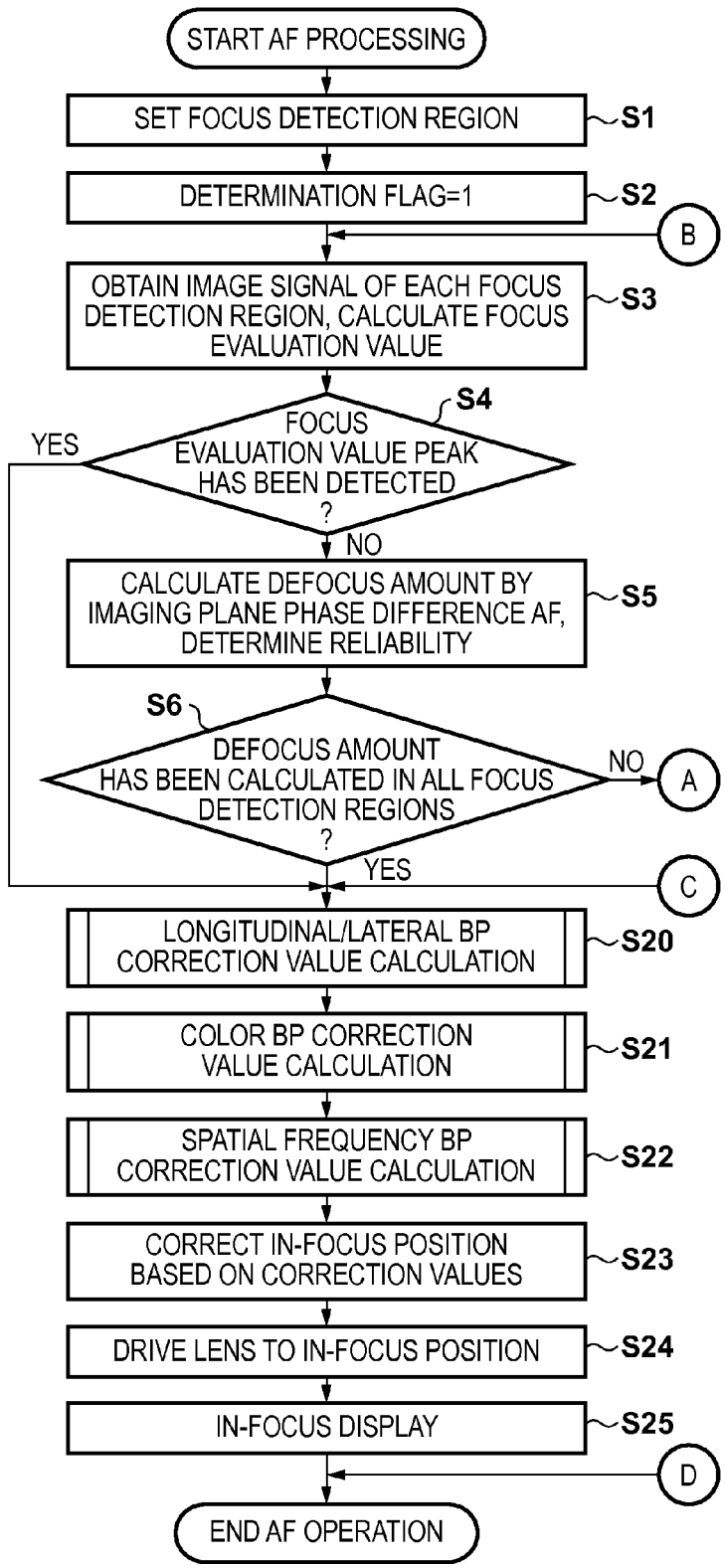
FIG. 1A is a flowchart showing an AF operation in an embodiment.
Figure 1B:
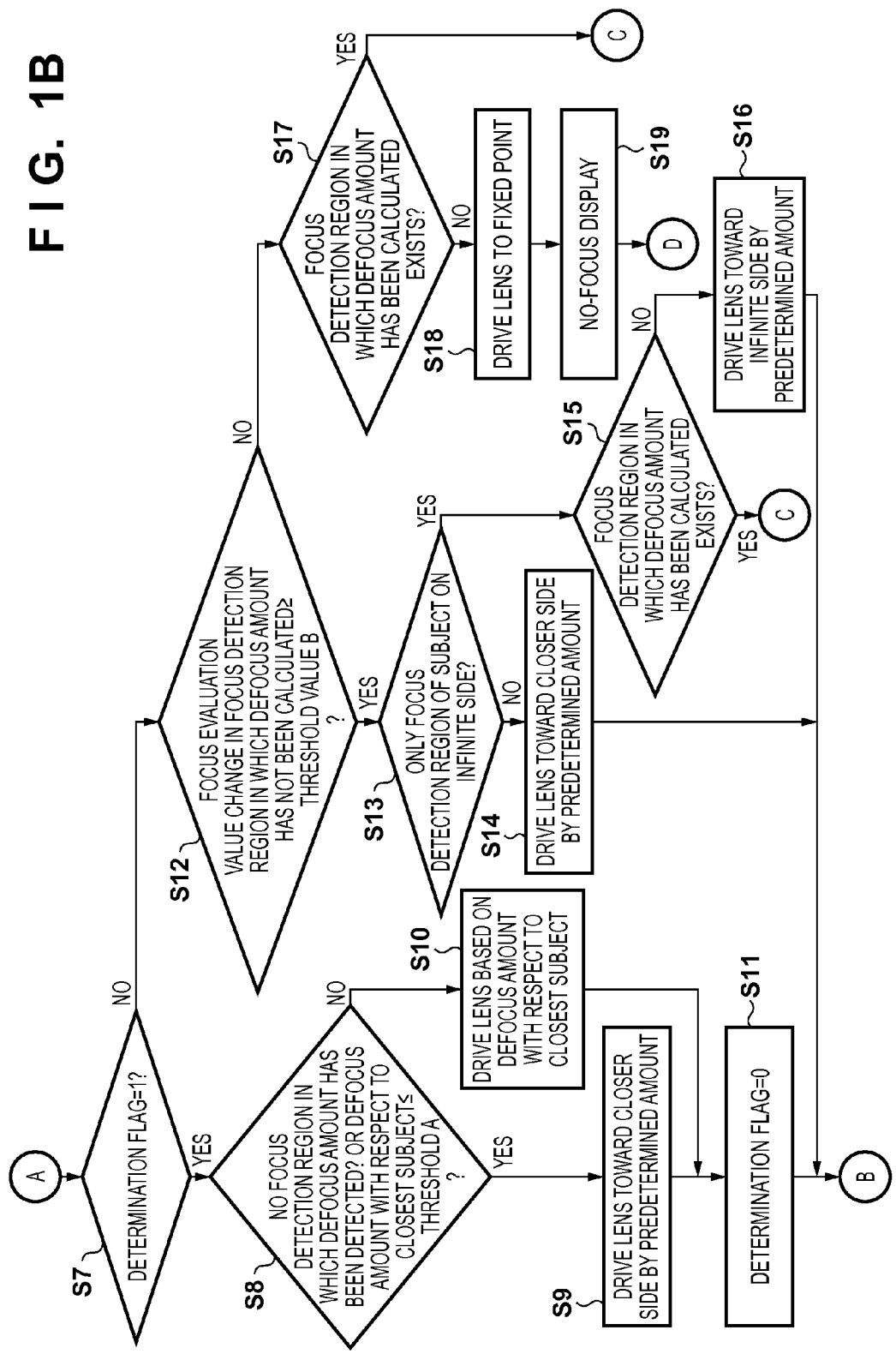
FIG. 1B is a flowchart showing the AF operation in an embodiment.

On the other hand, if a focus detection region exists in which the defocus amount cannot be calculated in step S6, the camera MPU 125 advances the processing to step S7 in FIG. 1B. In step S7, the camera MPU 125 determines whether or not the determination flag is 1. The determination flag is 1 when the driving of the focusing lens has not been performed even once since the AF operation started. If the driving of the focusing lens has ever been performed, the determination flag is 0. If the determination flag is 1, the camera MPU 125 advances the processing to step S8.

If, in step S8, the camera MPU 125 cannot calculate the defocus amount in any of the focus detection regions, or if the defocus amount indicating the presence of a subject on the closest side among the calculated defocus amounts is smaller than or equal to a predetermined threshold value A, the camera MPU 125 advances the processing to step S9. In step S9, the camera MPU 125 drives the focusing lens toward the closer side by a predetermined amount.

Here, a description will be given of the reason for driving the lens by a predetermined amount if the result of step S8 is Yes. First, the case where the defocus amount cannot be calculated in any region among the plurality of focus detection regions is the case where a subject on which focusing is to be performed has not been found at this moment. For this reason, before determining that focusing cannot be performed, the lens is driven by the predetermined amount with respect to all focus detection regions, in order to check the presence of a subject on which focusing is to be performed, such that a later-described change of the focus evaluation value can be determined. Also, the case where the defocus amount indicating the presence of a subject on the closest side among the calculated defocus amounts is smaller than or equal to the predetermined threshold value A is the case where the focus detection region that is almost in an in-focus state exists at this moment. In this situation, the lens is driven by the predetermined amount in order to check the possibility that a subject which has not been detected at this moment exists further on the closer side in the focus detection region in which the defocus amount cannot be calculated, such that the later-described change of the focus evaluation value can be determined.

Note that the predetermined amount by which the focusing lens is driven in step S9 may be determined by considering the sensitivity of the amount of focus movement on the imaging plane with respect to the F value or the lens drive amount of the imaging optical system.

On the other hand, if the result in step S8 is No, i.e., if the defocus amount indicating the presence of a subject on the closest side among the calculated defocus amounts is larger than the predetermined threshold value A, the processing proceeds to step S10. In this case, a focus detection region in which the defocus amount can be calculated exists, but this focus detection region is not in an in-focus state. For this reason, in step S10, the camera MPU 125 drives the lens based on the defocus amount indicating the presence of the subject on the closest side among the calculated defocus amounts.

After driving the lens in step S9 or S10, the camera MPU 125 advances the processing to step S11, sets the determination flag to 0, and returns the processing to step S3 in FIG. 1A.

If, in step S7, the determination flag is not 1 (i.e., the determination flag is 0), the camera MPU 125 advances the processing to step S12. In step S12, the camera MPU 125 determines whether or not the focus evaluation value in the focus detection region for the TVAF corresponding to the focus detection region in which the defocus amount cannot be calculated has changed by a predetermined threshold value B or larger before and after the driving of the lens. Although the focus evaluation value increases in some cases and decreases in other cases, it is determined in step S12 whether or not the absolute value of the amount of change of the focus evaluation value is larger than or equal to the predetermined threshold value B.

Here, the case where the absolute value of the amount of change of the focus evaluation value is larger than or equal to the predetermined threshold value B means that, although the defocus amount cannot be calculated, a change of a blurred state of a subject can be detected based on an increase or decrease of the focus evaluation value. For this reason, in the present embodiment, even in the case where the defocus amount cannot be detected by the phase-difference AF, the presence of a subject is determined based on an increase or decrease of the focus evaluation value, and the AF processing is continued. Focus adjustment can thereby be performed on a subject that has a large defocus amount and cannot be detected by the phase-difference AF.

Here, the predetermined threshold value B used in the determination is changed in accordance with the lens drive amount. If the lens drive amount is large, a larger value is set as the threshold value B than that in the case of a small lens drive amount. This is because, if a subject exists, the amount of change of the focus evaluation value increases in accordance with an increase of the lens drive amount. The threshold values B for the respective lens drive amounts are stored in the EEPROM 125c.

If the absolute value of the amount of change of the focus evaluation value is larger than or equal to the threshold value B, the camera MPU 125 advances the processing to step S13, and determines whether or not the focus detection region whose amount of change of the focus evaluation value is larger than or equal to the threshold value B is only the focus detection region indicating the presence of a subject on an infinite side. The case where the focus detection region indicates the presence of a subject on the infinite side is the case where the focus evaluation value decreases when the driving direction of the lens driving is a closer direction, or the case where the focus evaluation value increases when the driving direction of the lens driving is an infinite direction.

If the focus detection region whose amount of change of the focus evaluation value is larger than or equal to the threshold value B is not only the focus detection region indicating the presence of the subject on the infinite side, the camera MPU 125 advances the processing to step S14, and drives the lens toward the closer side by a predetermined amount. This is because the focus detection region indicating the presence of a subject on the closer side is included in the focus detection region whose amount of change of the focus evaluation value is larger than or equal to the threshold value B. Note that the reason for giving priority to a subject on the closer side is as mentioned above.

On the other hand, if, in step S13, the focus detection region whose amount of change of the focus evaluation value is larger than or equal to the threshold value B is only the focus detection region indicating the presence of a subject on the infinite side, the camera MPU 125 advances the processing to step S15. In step S15, the camera MPU 125 determines whether or not a focus detection region in which the defocus amount can be calculated exists. In the case where a focus detection region in which the defocus amount can be calculated exists (Yes in S15), the result of the phase-difference AF is given priority to the presence of the subject on the infinite side based on the focus evaluation value, and accordingly the camera MPU 125 advances the processing to step S20 in FIG. 1A.

If a focus detection region in which the defocus amount can be calculated does not exist (No in S15), the information indicating the presence of a subject is only the change of the focus evaluation value. For this reason, in step S16, the camera MPU 125 drives the lens toward the infinite side by a predetermined amount based on the change of the focus evaluation value, and returns the processing to step S3 in FIG. 1A.

The predetermined amount by which the lens is driven in steps S14 and S16 may be determined by considering the defocus amount that can be detected by the phase-difference AF. Although the detectable defocus amount is different depending on the subject, a lens drive amount is set in advance so as to prevent a situation where a subject cannot be detected and is passed through when driving the lens from a state where focus detection cannot be performed.

If the absolute value of the amount of change of the focus evaluation value is smaller than the predetermined threshold value B (No in S12), the camera MPU 125 advances the processing to step S17, and determines whether or not the focus detection region exists in which the defocus amount can be calculated exists. If the defocus amount cannot be calculated in any of the focus detection regions, the camera MPU 125 advances the processing to step S18, drives the lens to a predetermined fixed point, thereafter further advances the processing to step S19, performs display indicating a no-focus state on the display 126, and ends the AF processing. This is the case where there is no focus detection region in which the defocus amount can be calculated, and there is no focus detection region whose focus evaluation value has changed before and after the lens driving. In this case, since no information indicates the presence of a subject, the camera MPU 125 determines that focusing cannot be performed, and ends the AF processing.

On the other hand, if, in step S17, a focus detection region in which the defocus amount can be calculated exists, the camera MPU 125 advances the processing to step S20 in FIG. 1A, corrects the detected defocus amount (S20 to S23), and drives the focusing lens 104 to the in-focus position in step S24. Thereafter, in step S25, the camera MPU 125 performs display indicating an in-focus state on the display 126, and ends the AF processing.

Method for Calculating Vertical/Horizontal BP Correction Value

Figure 7:
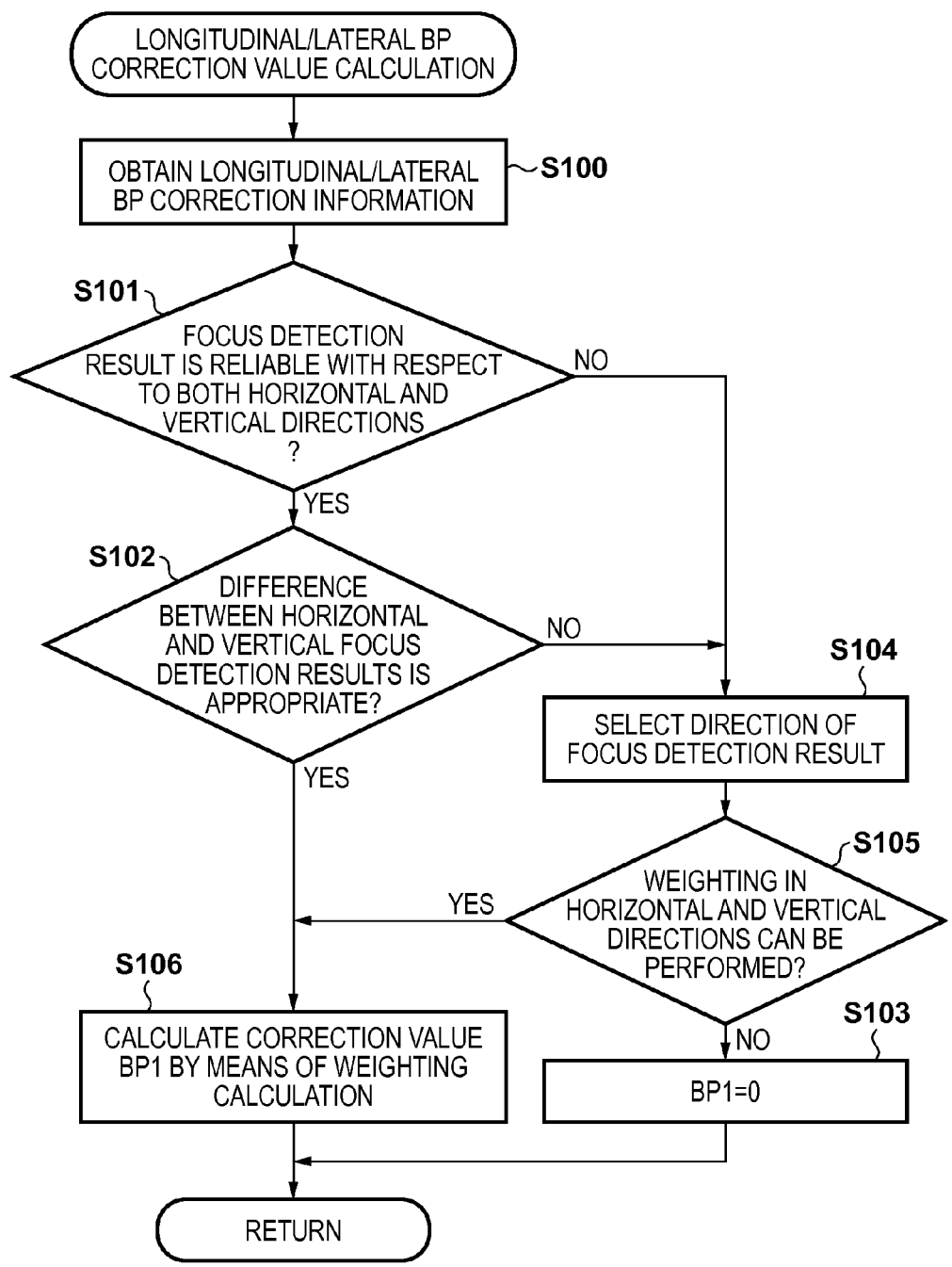
FIG. 7 is a flowchart of vertical/horizontal BP correction value (BP1) calculation processing in an embodiment.

Next, a description will be given, using FIGS. 7 to 8B, of a method of calculating the vertical/horizontal BP correction value (BP1) calculation in step S20 in FIG. 1A. FIG. 7 is a flowchart showing the details of the vertical/horizontal BP correction value (BP1) calculation processing.

In step S100, the camera MPU 125 obtains vertical/horizontal BP correction information. The vertical/horizontal BP correction information is information of a difference between an in-focus position in the horizontal direction (first direction) and an in-focus position in the vertical direction (second direction). In the present embodiment, the vertical/horizontal BP correction information is stored in advance in the lens memory 118 in the lens unit 100, and the camera MPU 125 obtains the vertical/horizontal BP correction information by requesting it from the lens MPU 117. However, the vertical/horizontal BP correction information may be stored in association with identification information of the lens unit in a nonvolatile area of the camera RAM 125b.

Figures 8A, 8B:
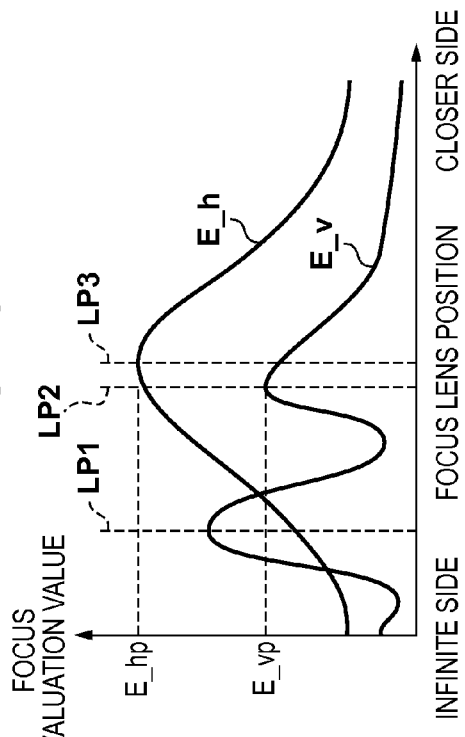
FIGS. 8A and 8B are diagrams for illustrating vertical/horizontal BP correction value calculation processing in an embodiment.

FIG. 8A shows exemplary vertical/horizontal BP correction information. Although an example of the vertical/horizontal BP correction information corresponding to the center focus detection regions 219a and 218ah in FIG. 6 is shown here, the vertical/horizontal BP correction information corresponding to the other focus detection regions 219c, 218ch, 219b, and 218bh is also stored. However, the focus detection correction values of focus detection regions existing at symmetrical positions with respect to the optical axis of the imaging optical system are equal to each other in design. Since the focus detection regions 219c and 218ch and the focus detection regions 219b and 218bh respectively satisfy this asymmetrical relationship in the present embodiment, the vertical/horizontal BP correction information of one of the focus detection region in each pair may be stored. Also, if the correction value does not significantly change depending on the position of the focus detection region, the correction value may be stored as a common value.

In the example shown in FIG. 8A, each of a zoom position (angle of view) and a focusing lens position (in-focus distance) in the imaging optical system is divided into 8 zones, and the focus detection correction values BP111 to BP188 are stored for respective zones. As the number of divided zones is larger, a more accurate correction value suitable for the position of the first lens group 101 and the position of the focusing lens 104 in the imaging optical system can be obtained. Also, the vertical/horizontal BP correction information can be used in both the contrast AF and the phase-difference AF.

In step S100, the camera MPU 125 obtains the correction value corresponding to the zoom position and the focusing lens position suitable for a correction target focus detection result.

In step S101, the camera MPU 125 determines whether reliable focus detection results have been obtained with respect to both the horizontal and vertical directions in the correction target focus detection region. The method for determining the reliability of the focus detection result is as described above regarding both the phase-difference AF and the contrast AF. Since only horizontal focus detection is performed in the phase-difference AF in the present embodiment, reliable focus detection results with respect to both the horizontal and vertical directions are obtained by the contrast AF. For this reason, the following description regarding the vertical/horizontal BP correction value assumes the contrast AF, whereas similar processing may be performed also in the case of performing focus detection by the phase-difference AF in both the horizontal and vertical directions. If it is determined in step S101 that both the horizontal and vertical focus detection results are reliable, the camera MPU 125 advances the processing to step S102.

In step S102, the camera MPU 125 determines whether or not a difference between the horizontal focus detection result and the vertical focus detection result is appropriate. This is processing performed in order to handle a problem of a shifting of focus between far and close subjects, which occurs when subjects at a far distance and at a close distance are included in the focus detection region. For example, if the far subject has horizontal contrast and the close subject has vertical contrast, there are cases where the absolute value is larger than an error that is caused by astigmatism in the imaging optical system, or where the focus detection results have opposite signs. If the difference between the horizontal focus detection result and the vertical focus detection result is larger than a predetermined determination value C, the camera MPU 125 determines that the difference is not appropriate (i.e., a shifting of focus has occurred). The camera MPU 125 then selects the horizontal direction or the vertical direction as a direction indicating the focus detection result that is further on the closer side, and advances the processing to step S104. Note that, for the above reason, the determination value C may be uniquely determined to be a value that significantly exceeds a possible difference caused by an aberration or the like, or may be set using the correction information obtained in step S100.

If it is determined in step S102 that the difference between the horizontal focus detection result and the vertical focus detection result is appropriate, the camera MPU 125 advances the processing to step S106.

On the other hand, if, in step S101, only the focus detection result in either the horizontal direction or the vertical direction is reliable, or if, in step S102, only one of the horizontal direction and the vertical direction is selected, the camera MPU 125 advances the processing to step S104. In step S104, the camera MPU 125 selects the direction of the focus detection result. The camera MPU 125 selects the direction in which the reliable focus detection result is calculated, or the direction in which the focus detection result corresponding to a subject that is further on the closer side is calculated in the determination regarding a shifting of focus.

Next, in step S105, the camera MPU 125 determines whether or not weighting in the horizontal direction and the vertical direction can be performed. When step S105 is executed, from the viewpoint of the reliability of the focus evaluation value and a shifting of focus, determination for calculating the vertical/horizontal BP correction value is performed again even though reliable focus detection results have not been obtained in both the horizontal and vertical directions. The reason thereof will now be described in detail using FIG. 8B.

FIG. 8B is a diagram showing an exemplary relationship between the position of the focusing lens 104 in the selected focus detection region and the focus evaluation values. Curves E_h and E_v in FIG. 8B denote changes of the horizontal focus evaluation value and the vertical focus evaluation value that are detected by the contrast AF. Signs LP1, LP2, and LP3 denote focusing lens positions. FIG. 8B shows the case where LP3 is obtained as a reliable focus detection result from the horizontal focus evaluation value E_h, and LP1 is obtained as a reliable focus detection result from the vertical focus evaluation value E_v. It is determined that a shifting of focus has occurred since LP1 and LP3 are significantly different, and the horizontal focus detection result LP3, which is the focus detection result that is further on the closer side, is selected in step S104.

In this situation, in step S105, the camera MPU 125 determines whether or not a vertical focus detection exists near the selected horizontal focus detection result LP3. Since LP2 exists in the situation in FIG. 8B, the camera MPU 125 determines that weighting in the horizontal and vertical directions can be performed, advances the processing to step S106, and calculates the correction value for the focus detection result LP3 while considering the influence of the focus detection result LP2.

Assume that BP1_B, which is one element in FIG. 8A, has been obtained as the vertical/horizontal BP correction information in step S100, the horizontal focus evaluation value at LP3 in FIG. 8B is E_hp, and the vertical focus evaluation value at LP2 is E_vp. In this case, in step S106, the camera MPU 125 calculates the vertical/horizontal BP correction value BP1 in accordance with Equation (2) below, based on the ratio of the focus evaluation value in a direction perpendicular to the direction subjected to the correction to the total of the focus evaluation values.

$$BP1 = BP1\_B \times E\_vp / (E\_vp + E\_hp) \times (+1) \quad (2)$$

Although the correction value BP1 is calculated using Equation (2) since the correction value for the horizontal focus detection result is calculated in the present embodiment, the calculation can be performed using Equation (3) below when correcting the vertical focus detection result.

$$BP1 = BP1\_B \times E\_hp / (E\_vp + E\_hp) \times (-1) \quad (3)$$

If it is determined in step S102 that the difference between the horizontal focus detection result and the vertical focus detection result is appropriate, the correction value BP1 is calculated using Equation (2) in the case where the focus detection result on the closer side is the horizontal detection result, or using Equation (3) in the case of the vertical detection result.

As is clear from Equations (2) and (3), the vertical/horizontal BP correction value (BP1) is calculated while determining that a subject contains a large amount of contrast information, based on the information indicating that the focus evaluation value is large. As described above, the vertical/horizontal BP correction information is:

(focus detection position of subject having contrast information only in vertical direction)−(focus detection position of subject having contrast information only in horizontal direction). For this reason, the correction value BP1 for correcting the horizontal focus detection result and the correction value BP1 for correcting the vertical focus detection result have opposite signs. Upon ending the processing in step S106, the camera MPU 125 ends the vertical/horizontal BP correction value calculation processing.

On the other hand, if it is determined in step S105 that a vertical focus detection result does not exist near the selected horizontal focus detection result LP3, the camera MPU 125 advances the processing to step S103. In step S103, the camera MPU 125 determines that the subject contains the contrast information substantially only in one direction, and accordingly BP1=0 is set, and the vertical/horizontal BP correction value calculation processing ends.

Thus, in the present embodiment, the correction value is calculated in accordance with the contrast information of a subject in different directions, and therefore the correction value can be accurately calculated in accordance with the pattern of the subject. Note that, although the case where a shifting of focus has occurred between subjects has been described in FIG. 8B, the correction value is also calculated based on a similar idea when one local maximum value is detected in each of the horizontal and vertical directions, and one of the focus detection results is not reliable.

However, the correction value calculation method in step S106 is not limited thereto. For example, if focus detection can be performed only in the horizontal direction as in the phase-difference AF in the present embodiment, the correction value may be calculated while assuming that the amount of the contrast information of the subject in the horizontal direction is the same as that in the vertical direction. In this case, the correction value can be calculated by substituting E_hp=E_vp=1 into Equation (2) or (3) above. By performing this processing, the correction accuracy lowers, but the load of the correction value calculation can be reduced.

Although the result of focus detection by the contrast AF has been described above, similar processing can also be performed on the result of focus detection by the phase-difference AF. The amount of change of a correlation amount calculated in correlation calculation in the phase-difference AF may be used as a coefficient of the weighting in the correction value calculation. In this case, the fact that the amount of change of the correlation amount is larger as the amount of the contrast information of the subject is larger is used, as in the case where a difference between brightness and darkness of the subject is large, or in the case where the number of edges with a difference in brightness and darkness is large. The evaluation value is not limited to the amount of change of the correlation amount and may be any kind of evaluation value, as long as a similar relationship is obtained therewith.

Thus, by correcting the focus detection result using the vertical/horizontal BP correction value, accurate focus detection can be performed regardless of the amount of the contrast information of the subject in each direction. Furthermore, since the horizontal and vertical correction values are calculated using the common correction information such as that shown in FIG. 8A, the storage capacity for the correction information can be reduced as compared with the case of storing the correction values for respective directions.

If the focus detection results in the respective directions are significantly different, the vertical/horizontal BP correction value is not calculated using these focus detection results, and the influence of a shifting of focus can thereby be reduced. Furthermore, in the case where a shifting of focus is assumed as well, more accurate correction can be performed by weighting the correction values based on which of the focus evaluation values in the respective directions are large or small.

Method for Calculating Color BP Correction Value

Figure 9A:
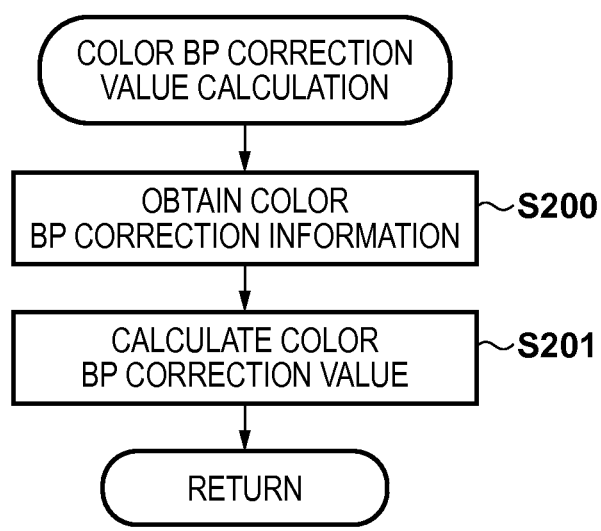

Next, a description will be given, using FIGS. 9A to 9C, of a method of the color BP correction value (BP2) calculation performed in step S21 in FIG. 1A. FIG. 9A is a flowchart showing the details of the color BP correction value (BP2) calculation processing.

In step S200, the camera MPU 125 obtains color BP correction information. The color BP correction information is information of a difference between an in-focus position detected using a green (G) signal and an in-focus position detected using signals of other colors (red (R), blue (B)). In the present embodiment, the color BP correction information is stored in advance in the lens memory 118 in the lens unit 100, and the camera MPU 125 obtains the color BP correction information by requesting it from the lens MPU 117. However, the color BP correction information may be stored in the nonvolatile area of the camera RAM 125b.

As the number of divided zones is larger, a more accurate correction value suitable for the position of the first lens group 101 and the position of the focusing lens 104 in the imaging optical system can be obtained. Also, the color BP correction information can be used in both the contrast AF and the phase-difference AF.

In step S200, the camera MPU 125 obtains the correction value corresponding to the zoom position and the focusing lens position suitable for a correction target focus detection result.

In step S201, the camera MPU 125 calculates the color BP correction value. If, in step S200, BP_R has been obtained as one element in FIG. 9B, and BP_B has been obtained as one element in FIG. 9C, the camera MPU 125 calculates the color BP correction value BP2 in accordance with Equation (4) below.

$$BP2 = K\_R \times BP\_R + K\_B \times BP\_B \quad (4)$$

Here, K_R and K_B are coefficients for correction information of respective colors. These coefficients are values correlating with a relationship regarding which the volumes of the red (R) and blue (B) information with respect to the volume of the green (G) information contained in the subject is larger, K_R takes a larger value with respect to a subject containing a large amount of red color, and K_B takes a larger value with respect to a subject containing a larger amount of blue color. Both K_R and K_B take small values with respect to a subject containing a larger amount of green color. K_R and K_B may be set in advance based on representative spectral information of the subject. If the spectral information of the subject can be detected, K_R and K_B may be set in accordance with the spectral information of the subject. After the calculation of the color BP correction value in step S202 ends, the camera MPU 125 ends the color BP correction value calculation processing.

Note that, although the correction values are stored in the form of tables for respective focus detection regions as shown in FIGS. 8A and 9A to 9C in the present embodiment, the method for storing the correction values is not limited thereto. For example, a configuration may be employed in which a coordinate system is set with the intersecting point of the image sensor and the optical axis of the imaging optical system as an origin, and the horizontal and vertical directions of the image capture apparatus respectively as an X axis and a Y axis, and the correction value at the center coordinates of the focus detection region is obtained using a function of X and Y. In this case, the volume of information to be stored as the focus detection correction values can be reduced.

In the present embodiment, the correction value used in focus detection in which calculation is performed using the vertical/horizontal BP correction information or the color BP correction information is calculated, assuming that the correction value does not depend on spatial frequency information that the pattern of a subject has. For this reason, accurate correction can be performed without increasing the amount of correction information to be stored. However, the method for calculating the correction value is not limited thereto. As with a later-described method for calculating the spatial frequency BP correction value, a correction value may be calculated in accordance with spatial frequency components of a subject, using the vertical/horizontal BP correction information or the color BP correction information with respect to each spatial frequency.

Method for Calculating Spatial Frequency BP Correction Value

Figure 10A:
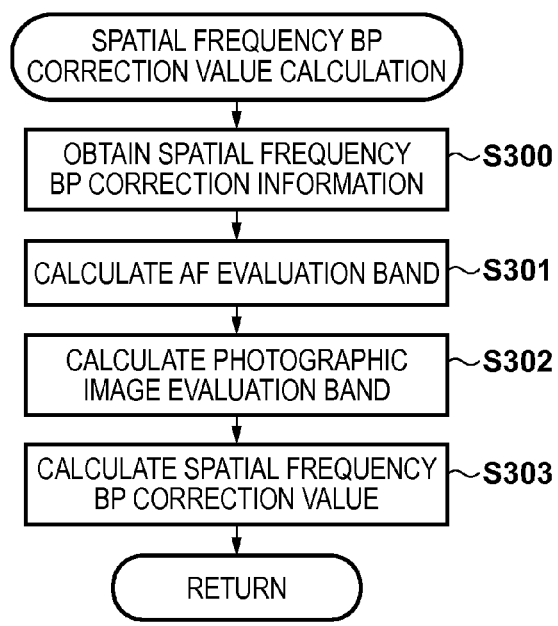
FIGS. 10A to 10C are diagrams for illustrating spatial frequency BP correction value (BP3) calculation processing in a first embodiment.

Next, a description will be given, using FIGS. 10A to 10C, of a method of the spatial frequency BP correction value (BP3) calculation performed in step S22 in FIG. 1A. FIG. 10A is a flowchart showing the details of the spatial frequency BP correction value (BP3) calculation processing.

In step S300, the camera MPU 125 obtains spatial frequency BP correction information. The spatial frequency BP correction information is information regarding an image forming position in the imaging optical system with respect to each spatial frequency of a subject. In the present embodiment, the spatial frequency BP correction information is stored in advance in the lens memory 118 in the lens unit 100, and the camera MPU 125 obtains the spatial frequency BP correction information by requesting it from the lens MPU 117. However, the spatial frequency BP correction information may be stored in the nonvolatile area of the camera RAM 125b.

Figure 10B:
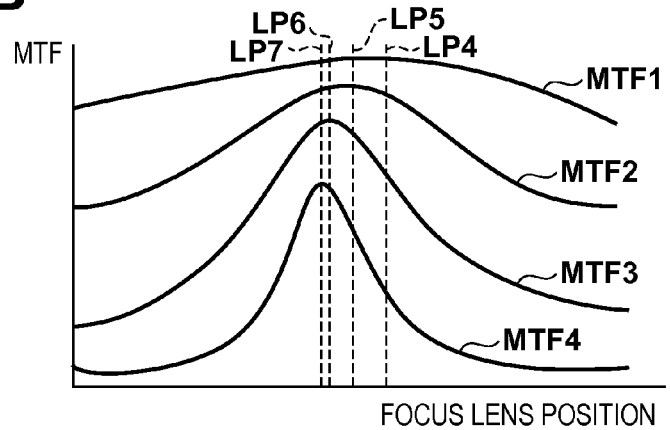
Figure 10C:
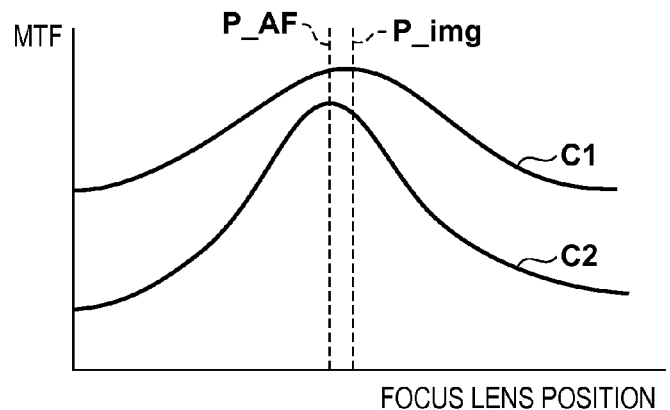

Exemplary spatial frequency BP correction information will be described using FIG. 10B showing a defocus MTF (Modulation Transfer Function) of the imaging optical system. The horizontal and vertical axes in FIG. 10B show the position of the focusing lens 104 and the intensity of the MTF, respectively. Four curves shown in FIG. 10B are MTF curves with respect to respective spatial frequencies, and indicate the case where the spatial frequency changes from low to high frequencies in the order of MTF1, MTF2, MTF3, and MTF4. The MTF curve of a spatial frequency F1 (lp/mm) corresponds to MTF1, and similarly, spatial frequencies F2, F3, and F4 (lp/mm) correspond to MTF2, MTF3, and MTF4, respectively. LP4, LP5, LP6, and LP7 indicate the positions of the focusing lens 104 corresponding to the local maximum values of the respective defocus MTF curves. Note that the stored spatial frequency BP correction information is obtained by discretely sampling the curves in FIG. 10B. As an example, in the present embodiment, MTF data for 10 focusing lens positions are sampled with respect to one MTF curve, and for example, 10 sets of data is stored as MTF1($n$) ($1 \leq n \leq 10$) with respect to MTF1.

The zoom position (angle of view) of the imaging optical system and the focusing lens position (in-focus distance) are divided into 8 zones at each position in the focus detection region, and the spatial frequency BP correction information of each zone is stored, similarly to the vertical/horizontal BP correction information and the color BP correction information. As the number of divided zones is larger, a more accurate correction value suitable for the position of the first lens group 101 and the position of the focusing lens 104 in the imaging optical system can be obtained. Also, the spatial frequency BP correction information can be used in both the contrast AF and the phase-difference AF.

In step S300, the camera MPU 125 obtains the correction value corresponding to the zoom position and the focusing lens position suitable for a correction target focus detection result.

In step S301, the camera MPU 125 calculates a band of a signal used when performing the contrast AF and the phase-difference AF in the correction target focus detection region. In the present embodiment, the camera MPU 125 calculates an AF evaluation band while considering the influence of a subject, the imaging optical system, the sampling frequency of the image sensor, and a digital filter used in the evaluation. A method for calculating the AF evaluation band will be described later.

Next, in step S302, the camera MPU 125 calculates a band of a signal used in a photographic image. As in the calculation of the AF evaluation band in step S302, the camera MPU 125 calculates a photographic image evaluation band, while considering the influence of the subject, the imaging optical system, frequency characteristics of the image sensor, and an evaluation band of a person who appreciates the photographic image.

Calculation of the AF evaluation band (second evaluation band) and the photographic image evaluation band (first evaluation band) performed in steps S301 and S302 will now be described using FIGS. 11A to 11F. FIGS. 11A to 11F indicates intensities with respect to the respective spatial frequencies, with the horizontal and vertical axes respectively indicating the spatial frequency and the intensity.

Figure 11A:
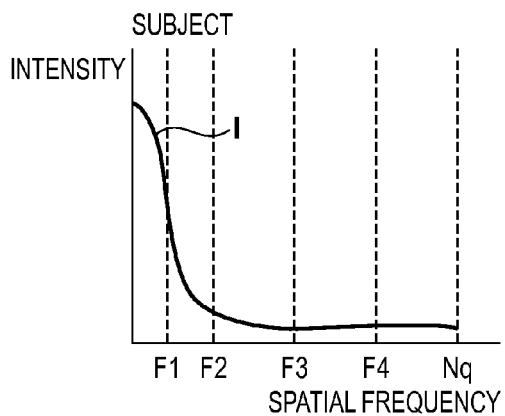
FIGS. 11A to 11F are diagrams showing various spatial frequency characteristics in an embodiment.

FIG. 11A shows a spatial frequency characteristic (I) of the subject. F1, F2, F3, and F4 on the horizontal axis are spatial frequencies corresponding to the MTF curves (MTF1 to MTF4) in FIG. 10B. Nq indicates a Nyquist frequency, which is determined by the pixel pitch of the image sensor 122. F1 to F4 and Nq are also similarly shown in FIGS. 11B to 11F, which will be described below. In the present embodiment, a representative value stored in advance is used as the spatial frequency characteristic (I) of the subject. The spatial frequency characteristic (I) of the subject, which is indicated by a continuous curve in FIG. 11A, has discrete values I(n) ($1 \leq n \leq 4$) corresponding to the spatial frequencies F1, F2, F3, and F4.

Although the present embodiment uses the representative value stored in advance as the spatial frequency characteristic of the subject, the spatial frequency characteristic of the subject to be used may be changed in accordance with the subject for which focus detection is performed. The spatial frequency information (power spectrum) of the subject can be obtained by applying FFT processing or the like on an image signal obtained by imaging. In this case, although the amount of calculation processing increases, a correction value suitable for a subject for which focus detection is actually performed can be calculated, and accordingly accurate focus detection can be performed. More simply, some kinds of spatial frequency characteristics stored in advance may be appropriately used depending on whether the contrast information of the subject is large or small.

Figure 11D:
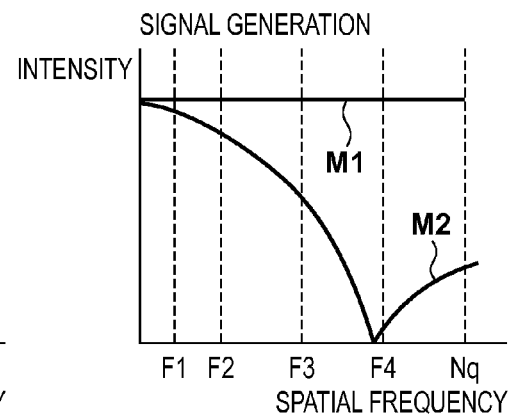
Figure 11B:
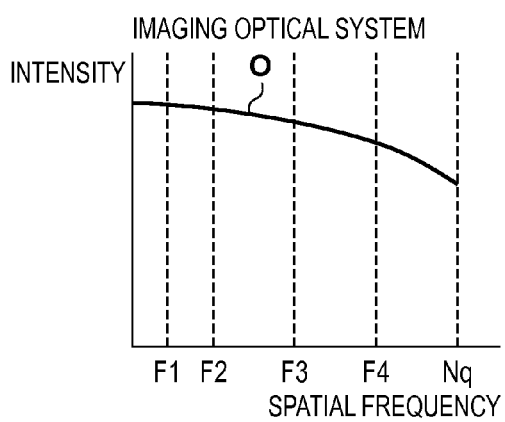

FIG. 11B shows a spatial frequency characteristic (O) of the imaging optical system. This information may be obtained through the lens MPU 117, or may be stored in the RAM 125b in the camera. The stored information may be the spatial frequency characteristics in respective defocus states, or may be only a spatial frequency characteristic in an in-focus state. Since the spatial frequency BP correction value is calculated near an in-focus position, accurate correction can be performed using the spatial frequency in an in-focus state. However, more accurate focus adjustment can be performed using the spatial frequency characteristics in respective defocus states, although a calculation load increases. The spatial frequency characteristic in a defocus state to be used may be selected using the defocus amount obtained by the phase-difference AF.

The spatial frequency characteristic (O) of the imaging optical system, which is indicated by a continuous curve in FIG. 11B, has discrete values O(n) ($1 \leq n \leq 4$) corresponding to the spatial frequencies F1, F2, F3, and F4.

Figure 11E:
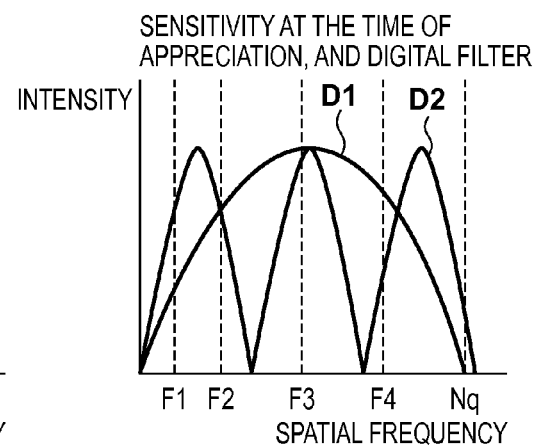
Figure 11C:
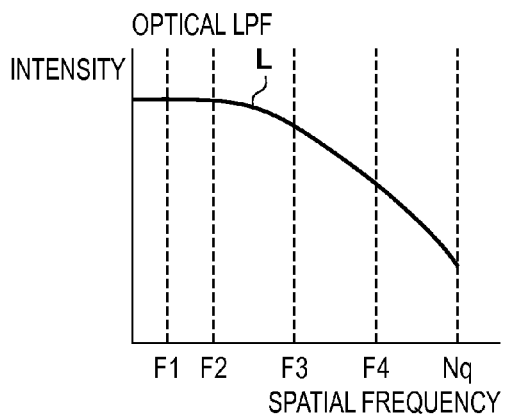

FIG. 11C shows a spatial frequency characteristic (L) of the optical low pass filter 121. This information is stored in the RAM 125b within the camera. The spatial frequency characteristic (L) of the optical low pass filter 121, which is indicated by a continuous curve in FIG. 11C, has discrete values L(n) ($1 \delta n \leq 4$) corresponding to the spatial frequencies F1, F2, F3, and F4.

FIG. 11D shows spatial frequency characteristics (M1, M2) at the time of signal generation. As mentioned above, the image sensor in the present embodiment has two readout modes. In the first readout mode, i.e., in the all-pixel readout mode, the spatial frequency characteristic does not change when generating a signal, as indicated by M1. On the other hand, in the second readout mode, i.e., in the thinning readout mode, the spatial frequency characteristic changes when generating a signal, as indicated by M2. As mentioned above, signals are added at the time of the thinning in the X direction to improve the S/N ratio, and therefore a low-pass effect is generated by the addition. M2 in FIG. 11D indicates the spatial frequency characteristic at the time of generating a signal in the second readout mode. Here, the low pass effect achieved by the addition is shown without taking the influence of the thinning into consideration.

The spatial frequency characteristics (M1, M2) at the time of signal generation, which are indicated by continuous curves in FIG. 11D, have discrete values M1($n$) and M2($n$) (1≤$n$≤4) corresponding to the spatial frequencies F1, F2, F3, and F4.

FIG. 11E shows a spatial frequency characteristic (D1) indicating the sensitivity with respect to each spatial frequency at the time of appreciating a photographic image, and a spatial frequency characteristic (D2) of a digital filter used in processing of an AF evaluation signal. The sensitivity with respect to each spatial frequency at the time of appreciating a photographic image is affected by individual differences of a person who appreciate the image, the image size, the distance at the time of appreciating the image, the environment in which the image is appreciated, such as the brightness, and the like. In the present embodiment, the sensitivity with respect to each spatial frequency at the time of appreciation is set and stored as a representative value.

On the other hand, in the second readout mode, folding noise (aliasing) of frequency components of a signal is generated due to the influence of the thinning. The spatial frequency characteristic of the digital filter is indicated by D2, taking this influence into consideration.

The spatial frequency characteristic (D1) at the time of appreciation and the spatial frequency characteristic (D2) of the digital filter, which are indicated by continuous curves in FIG. 11E, have discrete values D1($n$) and D2($n$) (1≤$n$≤4) corresponding to the spatial frequencies F1, F2, F3, and F4.

By thus storing various kinds of information in either the camera or the lens, the camera MPU 125 calculates a photographic image evaluation band W1 and an AF evaluation band W2, based on Equations (5) and (6) below.

$$W1(n)=I(n)\times O(n)\times L(n)\times M1(n)\times D1(n)(1\leq n\leq 4) \quad (5)$$

$$W2(n)=I(n)\times O(n)\times L(n)\times M2(n)\times D2(n)(1\leq n\leq 4) \quad (6)$$

Figure 11F:
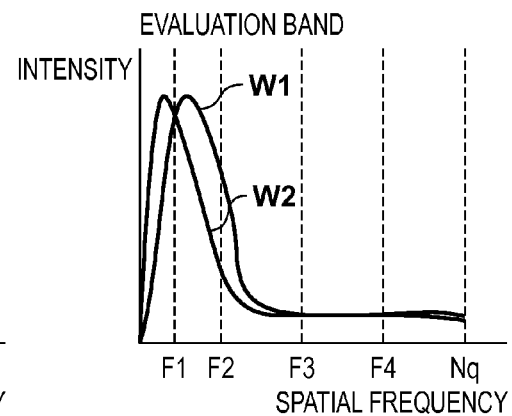

FIG. 11F shows the photographic image evaluation band W1 (first evaluation band) and the AF evaluation band W2 (second evaluation band). By performing calculation of Equations (5) and (6), a degree of the influence that factors determining an in-focus state of the photographic image have with respect to each spatial frequency can be quantified. Similarly, a degree of the influence that an error in the focus detection results has with respect to each spatial frequency can be quantified.

The information stored in the camera may be W1 and W2 that are calculated in advance. As described above, when the digital filter or the like used in the AF evaluation is changed, the correction value can be calculated while flexibly responding to this change, by performing the calculation every time the correction is performed. On the other hand, if W1 and W2 are store in advance, the calculation of Equations (5) and (6) and the storage capacity for various data can be reduced.

Since all calculation does not need to be finished in advance, a configuration may also be employed in which, for example, only the spatial frequency characteristics of the imaging optical system and the subject are calculated in advance and stored in the camera, thereby reducing the data storage capacity and the amount of calculation.

FIGS. 11A to 11F have been described using the discrete values corresponding to four spatial frequencies (F1 to F4), for the purpose of simplification of the description. However, a larger number of spatial frequencies with respect to which data is held will lead to more correct reproduction of the spatial frequency characteristics of the photographic image and the AF evaluation band, and the correction value can be accurately calculated. On the other hand, the amount of calculation can be reduced by reducing the number of spatial frequencies to be weighted. The subsequent calculation may be performed while holding one spatial frequency representing the photographic image evaluation band and one spatial frequency representing the AF evaluation band spatial frequency.

Returning to FIG. 10A, in step S303, the camera MPU 125 calculates the spatial frequency BP correction value (BP3). When calculating the spatial frequency BP correction value, the camera MPU 125 initially calculates a defocus MTF (C1) of the photographic image and a defocus MTF (C2) of a focus detection signal. C1 and C2 are calculated using the defocus MTF information obtained in step S300 and the evaluation bands W1 and W2 obtained in steps S301 and S302, in accordance with Equation (7) below.

$$C1(n)=MTF1(n)\times W1(1)+MTF2(n)\times W1(2)+MTF3(n)\times W1(3)+MTF4(n)\times W1(4) \quad (7)$$

$$C2(n)=MTF1(n)\times W2(1)+MTF2(n)\times W2(2)+MTF3(n)\times W2(3)+MTF4(n)\times W2(4) \quad (8)$$

Thus, the defocus MTF information with respect to the respective spatial frequencies shown in FIG. 10B is added based on the weighting of the evaluation bands of the photographic image and the AF calculated in steps S301 and S302, and the defocus MTF (C1) of the photographic image and the defocus MTF (C2) of the AF are obtained. FIG. 10C shows C1 and C2, which are the two obtained defocus MTFs. The horizontal and vertical axes respectively indicate the position of the focusing lens 104 and the MTF value obtained by performing weighted addition with respect to each spatial frequency. The camera MPU 125 detects a local maximum value position of each MTF curve. P_img (first image forming position) is detected as the position of the focusing lens 104 corresponding to the local maximum value of the curve C1. P_AF (second image forming position) is detected as the position of the focusing lens 104 corresponding to the local maximum value of the curve C2.

In step S303, the camera MPU 125 calculates the spatial frequency BP correction value (BP3) using Equation (9) below.

$$BP3=P\_AF-P\_img \quad (9)$$

With Equation (9), the correction value for correcting an error that may possibly occur between the in-focus position of the photographic image and the in-focus position detected by the AF can be calculated.

As described above, the in-focus position of the photographic image changes depending on the spatial frequency characteristics of the subject, the imaging optical system, and the optical low pass filter, the spatial frequency characteristics at the time of signal generation, the spatial frequency characteristics indicating the sensitivity with respect to each frequency at the time of appreciation, image processing performed on the photographic image, and the like. In the present embodiment, an in-focus position of the photographic image can be accurately calculated by going back to a process of generating the photographic image and calculating the spatial frequency characteristics. For example, the in-focus position of the photographic image is changed in accordance with the recording size of the photographic image, super-resolution processing performed in image processing, sharpness, or the like. Furthermore, the image size or the magnification ratio with which the photographic image after being recorded is appreciated, the appreciating distance at which the photographic image is appreciated, and the like affect the evaluation band of the appreciating person. The in-focus position of the photographic image is changed by setting characteristics in which high-frequency components of the evaluation band of the appreciating person are more weighted as the image size is larger, and as the appreciating distance is shorter.

On the other hand, the in-focus position detected by the AF similarly changes depending on the spatial frequency characteristics of the subject, the imaging optical system, and the optical low pass filter, the spatial frequency characteristics at the time of signal generation, the digital filter spatial frequency used in the AF evaluation, and the like. In the present embodiment, the spatial frequency characteristics are calculated by going back to the process of generating a signal used in the AF, and the in-focus position detected by the AF can thereby be accurately calculated. For example, the AF in the first readout mode can also be flexibly handled. In this case, a weighting coefficient need only be calculated by changing the spatial frequency characteristics at the time of signal generation to characteristics corresponding to the first readout mode.

Since the image capture apparatus described in the present embodiment is a lens-interchangeable single-lens reflex camera, the lens unit 100 can be replaced. If the lens unit 100 is replaced, the lens MPU 117 transmits the defocus MTF information corresponding to the respective spatial frequencies to the camera body 120. The camera MPU 125 then calculates the in-focus position of the photographic image and the in-focus position detected by the AF, and accordingly the correction value can be accurately calculated for each interchangeable lens. The lens unit 100 may transmit not only the defocus MTF information but also information such as the spatial frequency characteristic of the imaging optical system to the camera body 120. The way of making use of this information is as described above.

Similarly, if the camera body 120 is replaced, the pixel pitch, characteristics of the optical low pass filter, or the like changes in some cases. As described above, in this case as well, the correction value suitable for the characteristics of the camera body 120 is calculated, and accordingly accurate correction can be performed.

Although the correction value is calculated by the camera MPU 125 in the above description, the calculation may be performed by the lens MPU 117. In this case, a configuration may be employed in which the camera MPU 125 transmits, to the lens MPU 117, various kinds of information that has been described using FIGS. 11A to 11F, and the lens MPU 117 calculates the correction value using the defocus MTF information and the like. In this case, in step S24 in FIG. 1A, the lens MPU 117 need only correct the in-focus position transmitted from the camera MPU 125 and drive the lens.

In the present embodiment, the correction value for the AF is calculated while paying attention to the characteristics (vertical/horizontal, color, spatial frequency band) of the signal used in focus detection. For this reason, the correction value can be calculated using a similar method, regardless of the AF method. Since the correction method and data to be used in the correction do not need to be held for each AF method, the data storage capacity and the calculation load can be reduced.

Second Embodiment

Next, a second embodiment of the present invention will be described. A major difference from the first embodiment lies in the method for calculating the spatial frequency BP correction value. In the first embodiment, the defocus MTF information is used as the value representing the characteristics of the imaging optical system with respect to the respective spatial frequencies. However, the data volume of the defocus MTF information is large, which increases the storage capacity and the calculation load. For this reason, in the second embodiment, the spatial frequency BP correction value is calculated using local maximum value information of the defocus MTF. It is thereby possible to achieve saving of the capacity of the lens memory 118 or the RAM 125b, a reduction in the amount of communication between the lens and camera, and a reduction in the load of the calculation performed by the camera MPU 125, for example.

Note that the block diagram (FIG. 2) of the image capture apparatus, the diagrams (FIGS. 3A to 5) illustrating the focus detection methods, the diagram (FIG. 6) illustrating the focus detection regions, and the flowcharts (FIGS. 1A, 1B, 7, and 9A) of the focus detection processing and various kinds of BP correction value calculation processing will be also used in the present embodiment. The flowchart (FIG. 10A) of the spatial frequency BP correction value calculation processing and the diagrams (FIGS. 11A to 11F) illustrating the evaluation bands will also be used.

A method for calculating the spatial frequency BP correction value (BP3) in the present embodiment will now be described using FIG. 12.

In step S300, the camera MPU 125 obtains spatial frequency BP correction information.

Figure 12:
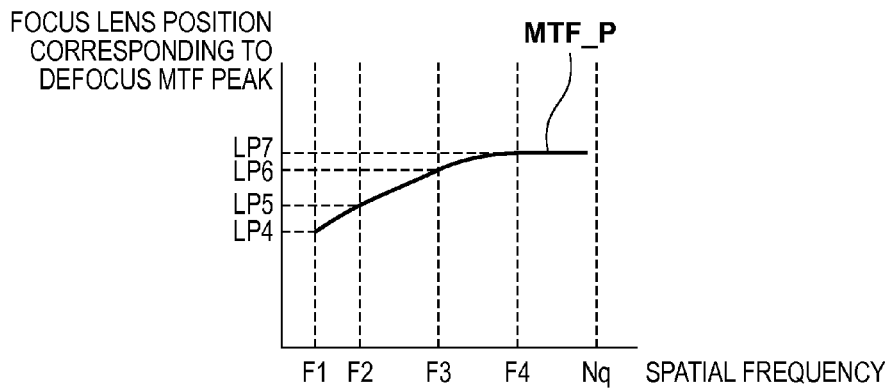
FIG. 12 is a diagram for illustrating spatial frequency BP correction value (BP3) calculation processing in a second embodiment.

FIG. 12 shows positions of the focusing lens 104 at which the defocus MTFs take their local maximum values with respect to respective spatial frequencies, which are characteristics of the imaging optical system. The focusing lens positions LP4, LP5, LP6, and LP7 at which the defocus MTFs reach their peaks (local maximum values) with respect to the discrete spatial frequencies F1 to F4 shown in FIG. 10B are shown along the vertical axis. In the present embodiment, LP4 to LP7 are stored as MTF_P(n) ($1 \leq n \leq 4$) in the lens memory 118 or the RAM 125b. The stored information is associated with the position of the focus detection region, the zoom position, and the focusing lens position, as in the first embodiment.

In the second embodiment, in step S300 in the spatial frequency BP correction value processing shown in FIG. 10A, the camera MPU 125 obtains a correction value corresponding to the zoom position and the focusing lens position suitable for a correction target focus detection result.

In steps S301 and S302, the camera MPU 125 performs processing similar to that in the first embodiment.

In step S303, the camera MPU 125 calculates the spatial frequency BP correction value (BP3). When calculating the spatial frequency BP correction value, the camera MPU 125 initially calculates an in-focus position (P_img) of the photographic image and an in-focus position (P_AF) detected by the AF, in accordance with Equations (10) and (11) below. The calculation uses the defocus MTF information MTF_P(n) obtained in step S300 and the evaluation bands W1 and W2 obtained in steps S301 and S302.

$$P\_img = MTF\_P(1) \times W1(1) + MTF\_P(2) \times W1(2) + MTF\_P(3) \times W1(3) + MTF\_P(4) \times W1(4) \tag{10}$$

$$P\_AF = MTF\_P(1) \times W2(1) + MTF\_P(2) \times W2(2) + MTF\_P(3) \times W2(3) + MTF\_P(4) \times W2(4) \tag{11}$$

That is to say, the local maximum value information MTF_P(n) of the defocus MTF with respect to each spatial frequency shown in FIG. 12 is subjected to weighted addition using the evaluation bands W1 and W2 of the photographic image and the AF calculated in steps S301 and S302.

The in-focus position (P_img) of the photographic image and the in-focus position (P_AF) detected by the AF are thereby calculated.

Next, the camera MPU 125 calculates the spatial frequency BP correction value (BP3) as in the first embodiment, using Equation (9) below.

$$BP3 = P\_AF - P\_img \quad (9)$$

In the present embodiment, the spatial frequency BP correction value can be calculated more easily. Although the accuracy of the spatial frequency BP correction value in the present embodiment is slightly lower than that in the first embodiment, it is possible to achieve a reduction in the amount of information stored for calculating the spatial frequency BP correction value, a reduction in the amount of communication between the lens and the camera, and a reduction in the load of the calculation performed by the camera MPU 125.

Third Embodiment

Next, a third embodiment of the present invention will be described. In the present embodiment as well, the method for calculating the spatial frequency BP correction value is different from those in the above embodiments. In the present embodiment, the spatial frequency BP correction value is not calculated when the calculation is not necessary, thereby reducing the amount of communication between the lens and camera and reducing the load of the calculation performed by the camera MPU 125, while not lowering the accuracy of the spatial frequency BP correction value.

Note that the block diagram (FIG. 2) of the image capture apparatus, the diagrams (FIGS. 3A to 5) illustrating the focus detection methods, the diagram (FIG. 6) illustrating the focus detection regions, and the flowcharts (FIGS. 1A, 1B, 7, and 9A) of the focus detection processing and various kinds of BP correction value calculation processing will be also used in the present embodiment. The diagrams (FIGS. 10B to 10C) relating to the spatial frequency BP correction value calculation processing will also be used.

Figure 13:
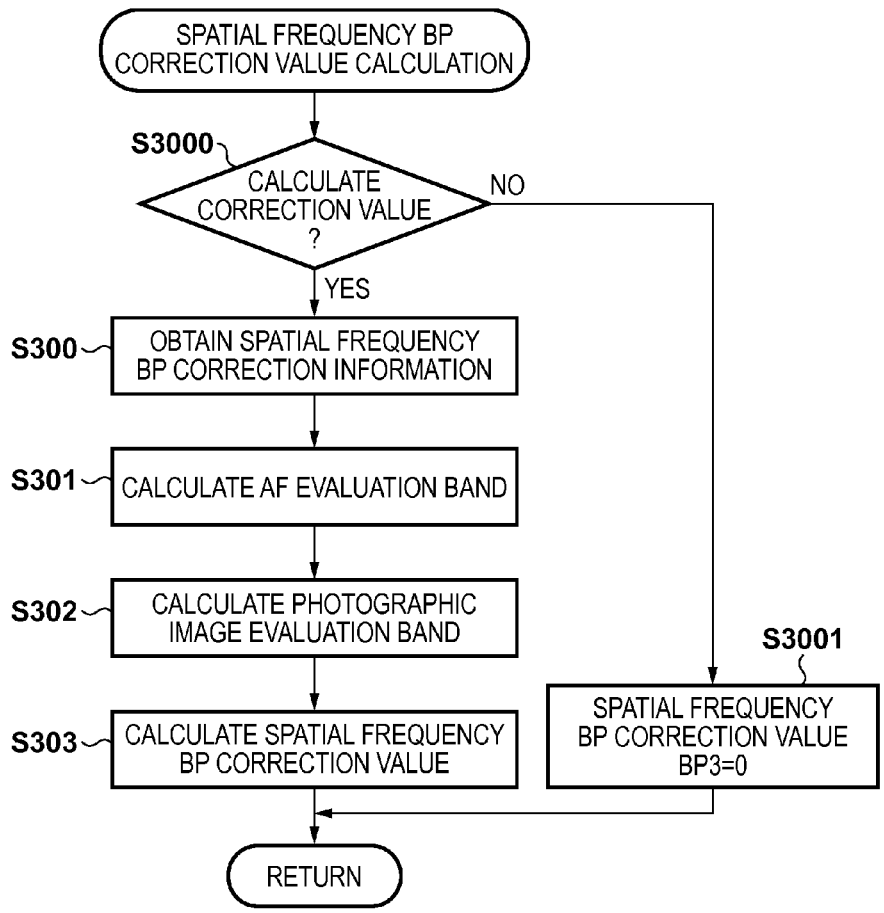
FIG. 13 is a flowchart for illustrating spatial frequency BP correction value (BP3) calculation processing in a third embodiment.

A method for calculating the spatial frequency BP correction value (BP3) in the present embodiment will now be described using a flowchart in FIG. 13. Processing in FIG. 13 that is similar to processing in FIG. 10A will be given the same reference numeral, and a redundant description will be omitted.

In step S3000, the camera MPU 125 determines whether or not the spatial frequency BP correction value needs to be calculated. As is understood from the description of the first embodiment, the more similar the photographic image evaluation band W1 and the AF evaluation band W2 are, the smaller the spatial frequency BP correction value is. For this reason, in the present embodiment, if it is determined that the difference between the two evaluation bands is small to the extent to which the spatial frequency BP correction value does not need to be calculated, the calculation of the correction value is omitted.

Specifically, the calculation of the correction value is omitted if a condition is satisfied under which the difference between the two evaluation bands is sufficiently small. For example, if the signal used in the AF is also a signal read out in the first mode, the photographic image evaluation band is equal to the AF evaluation band. Furthermore, when using, in processing of AF evaluation signal, a digital filter having a spatial frequency characteristic similar to the spatial frequency characteristic indicating the sensitivity with respect to each spatial frequency at the time of appreciating the photographic image, the spatial frequency characteristic at the time of appreciation is equal to the spatial frequency characteristic of the digital filter. This situation occurs in the case of displaying an image to be displayed on the display 126 in an enlarging manner, for example.

Similarly, it is assumed that the photographic image evaluation band is equal to the AF evaluation band when the photographic image is generated using the signal which is read out in the second readout mode. This situation occurs in the case where the size of a recorded image of the photographic image is set to be small.

If, in step S3000, any of such predetermined conditions is satisfied, the camera MPU 125 determines that the calculation of the correction value is not necessary, and advances the processing to step S3001.

In step S3001, since the correction value is not calculated, the camera MPU 125 substitutes 0 for BP3, and ends the spatial frequency BP correction value (BP3) calculation processing.

On the other hand, if it is determined in step S3000 that the calculation of the correction value is necessary, the camera MPU 125 performs steps S300 to S303 as in the first embodiment (or the second embodiment).

Since the present embodiment thus omits the calculation of the correction value if it is determined that the calculation of the spatial frequency BP correction value is not necessary, the amount of data communication and the calculation load at the time of calculating the correction value can be reduced, although the volume of data stored for calculating the correction value cannot be reduced. Note that the present embodiment can be combined with the second embodiment, and in this case, the amount of data communication and the calculation load at the time of calculating the correction value can be further reduced, not to mention a reduction in the volume of data stored for calculating the correction value.

Although the present embodiment has described the omission of the spatial frequency BP correction value, the vertical/horizontal BP correction value and the color BP correction value can also be omitted, if it is determined that these correction values are not necessary. For example, when performing focus detection while considering both the vertical and horizontal contrast, the calculation of the vertical/horizontal BP correction value may be omitted. If a color signal used in the photographic image is equal to a color signal used in focus detection, the calculation of the color BP correction value may be omitted.

Fourth Embodiment

Next, a fourth embodiment of the present invention will be described. The present embodiment is different from the first embodiment mainly in the methods for calculating various BP correction values. In the present embodiment, the vertical/horizontal BP correction value, the color BP correction value, and the spatial frequency BP correction value are calculated as different correction values. However, since the vertical/horizontal BP correction value and the color BP correction value also depend on the spatial frequency, the vertical/horizontal BP correction value and the color BP correction value are also calculated while considering the spatial frequency in the fourth embodiment. The correction values can thereby be calculated more accurately, although the capacity necessary for the lens memory 118 or the RAM 125*b* increases. Furthermore, a reduction in the amount of calculation can be achieved by changing the order of calculation of the BP correction values, information of temporarily stored coefficients, and the like.

Note that the block diagram (FIG. 2) of the image capture apparatus, the diagrams (FIGS. 3A to 5) illustrating the focus detection methods, the diagram (FIG. 6) illustrating the focus detection region, and the diagrams (FIGS. 11A to 11F) illustrating the evaluation bands are common in the present embodiment, and accordingly will also be used in the following description.

A method for calculating a BP correction value (BP) in the present embodiment will now be described using FIGS. 14 to 17.

Figure 14:
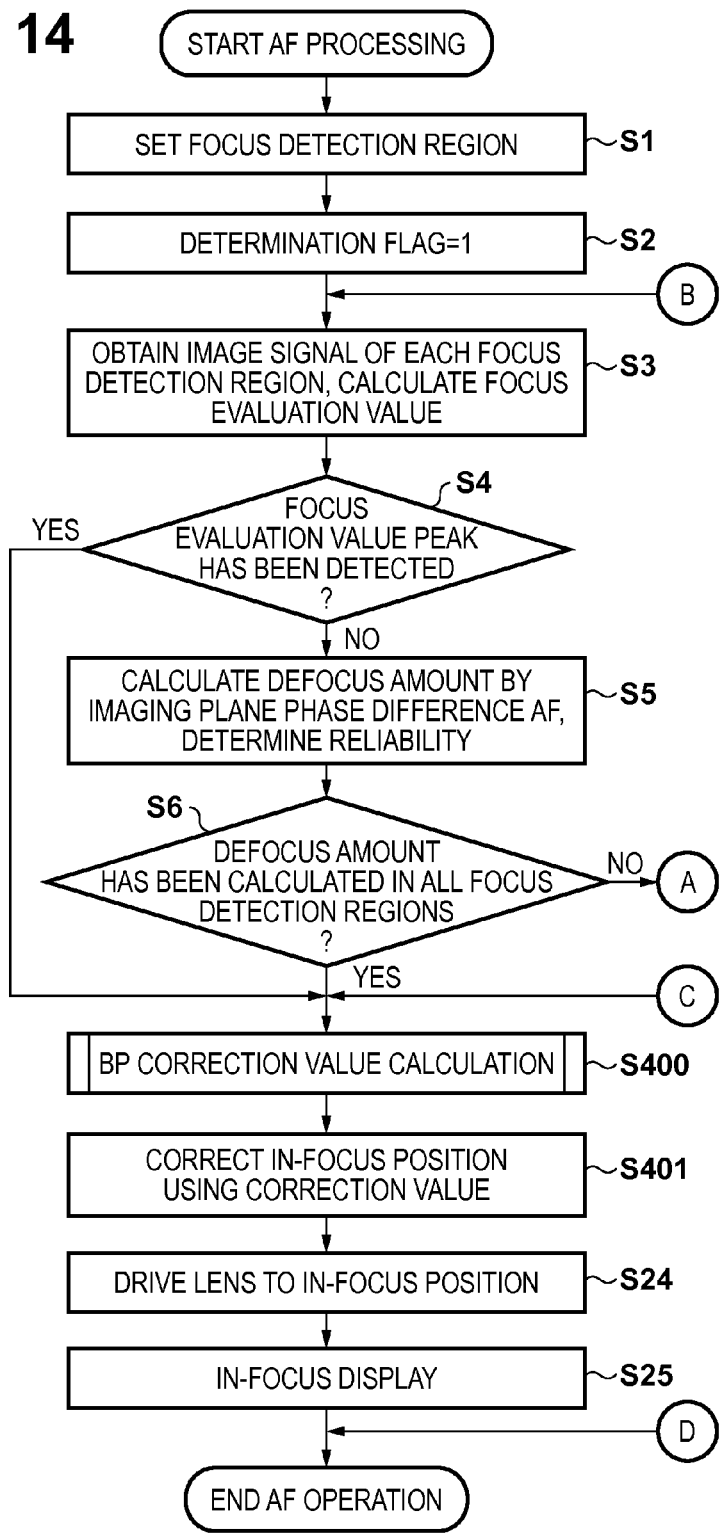
FIG. 14 is a flowchart showing an AF operation in a fourth embodiment.

In FIG. 14, processing similar to the focus detection processing in the first embodiment are given the same reference numerals as those in FIG. 1A. FIG. 14 is different from FIG. 1A in that steps S20 to S22 are replaced with step S400, and step S23 is replaced with step S401. In step S400, the camera MPU 125 calculates a BP correction value (BP) for collectively correcting various error factors, such as the direction (vertical/horizontal), the color, and the spatial frequency.

In step S401, the camera MPU 125 corrects the focus detection result DEF_B using the calculated BP correction values (BP) in accordance with Equation (12), and calculates a focus detection result DEF_A after the correction.

$$DEF\_A = DEF\_B + BP \quad (12)$$

In the present embodiment, the BP correction value is calculated using information of the positions of the focusing lens 104 indicating local maximum values of the defocus MTF of six spatial frequencies, which are combinations of three colors, namely red (R), green (G), and blue (B), and two directions, namely vertical and horizontal directions. It is thereby possible to consider the dependency of the color and the direction (vertical and horizontal) on the spatial frequencies, calculate a more accurate BP correction value, and improve the correction accuracy.

Figure 15:
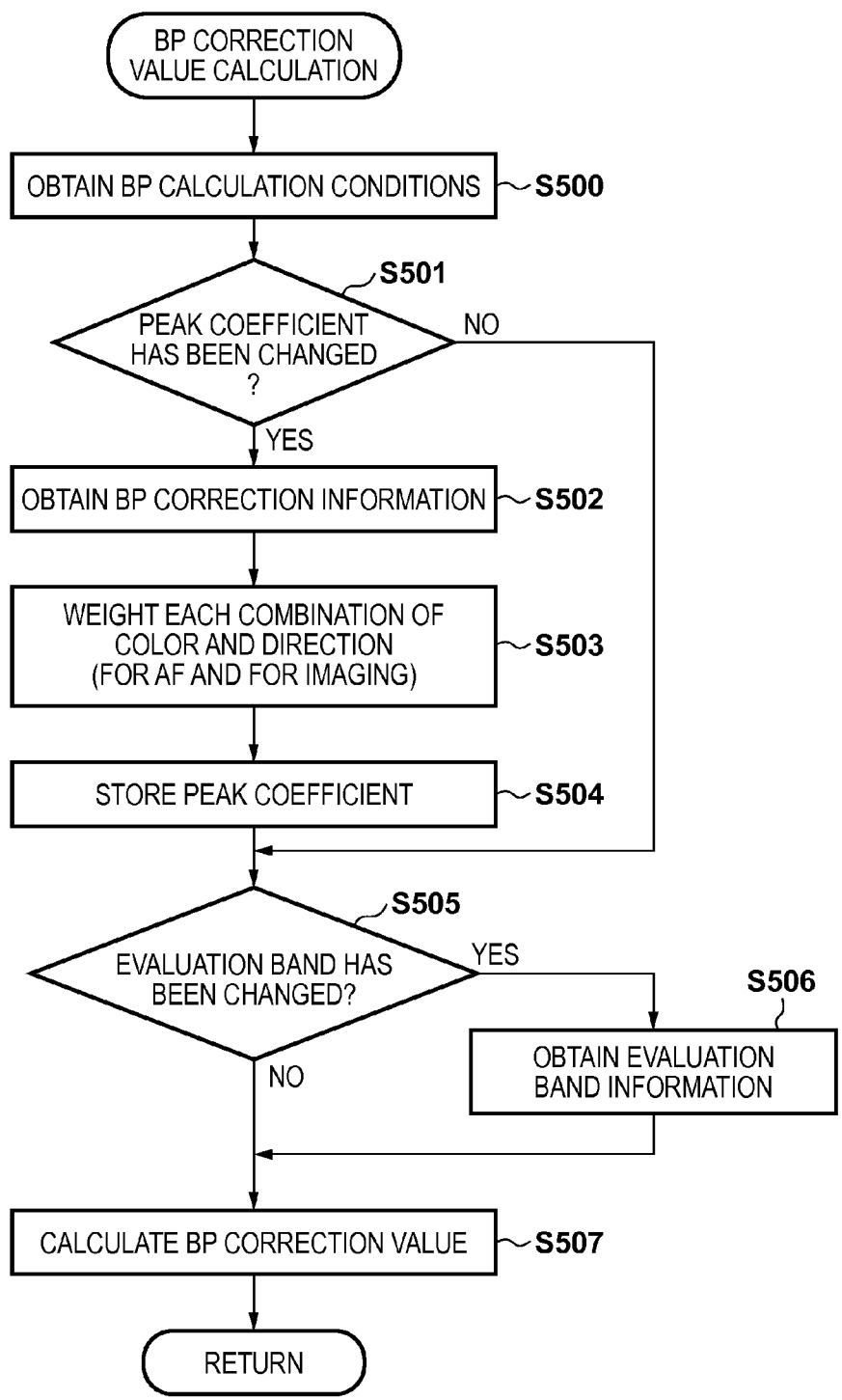
FIG. 15 is a diagram for illustrating BP correction value (BP) calculation processing in the fourth embodiment.

FIG. 15 is a flowchart showing the details of the BP correction value calculation processing in step S400 in FIG. 14.

In step S500, the camera MPU 125 obtains parameters (calculation conditions) necessary for calculating the BP correction value. As described in the first embodiment, the BP correction value changes with a change of the imaging optical system and a change of the focus detection optical system, such as a change of the position of the focusing lens 104, the position of the first lens group 101 indicating a zoom state, and the position of the focus detection region. For this reason, in step S500, the camera MPU 125 obtains information of the position of the focusing lens 104, the position of the first lens group 101 indicating the zoom state, and the position of the focus detection region, for example. Furthermore, in step S500, the camera MPU 125 obtains setting information regarding colors and evaluation directions of the signal used in focus detection and the signal used in the photographic image.

FIG. 16A shows exemplary setting information regarding the colors and the evaluation directions. This setting information is information indicating the degree of weighting with respect to combinations of the colors (red, green, and blue) and the directions (horizontal and vertical) of contrast with which a focus condition is evaluated. The setting information for focus detection is different from the setting information for the photographic image. For example, when correcting a result of the contrast AF using a horizontal green signal, the setting information for focus detection may be defined as follows:

$K\_AF\_RH = 0$ $K\_AF\_GH = 1$ $K\_AF\_BH = 0$ $K\_AF\_RV = 0$ $K\_AF\_GV = 0$ $K\_AF\_BV = 0$

With the above setting information, it can be indicated that the information of the defocus MTF peak of the signal for focus detection is the same as the characteristic of the horizontal green signal.

On the other hand, the setting information for the photographic image may be defined as follows:

$K\_IMG\_RH = 0.15$ $K\_IMG\_GH = 0.29$ $K\_IMG\_BH = 0.06$ $K\_IMG\_RV = 0.15$ $K\_IMG\_GV = 0.29$ $K\_IMG\_BV = 0.06$

These are values set by assuming that weighting for converting RGB signals is performed so as to be equivalent to Y signals, the photographic image is evaluated based on the Y signals, and both the horizontal contrast and the vertical contrast are equally evaluated. However, set values, types of the set values, and the like are not limited thereto.

In step S501, the camera MPU 125 determines whether or not a later-described peak coefficient has been changed. This determination is performed in order to omit recalculation of the peak coefficient, in the case where various conditions are identical in previously-performed BP correction value calculation and the current BP correction value calculation. In the present embodiment, the camera MPU 125 determines that the peak coefficient has not been changed if there has been no change in the setting information (FIG. 16A) regarding the color and the evaluation direction for focus detection and the photographic image and in the position of the focus detection region, and advances the processing to step S505, skipping steps S502 to S504.

If, in step S501, the peak coefficient is calculated for the first time, or if it is determined that the peak coefficient has been changed, the camera MPU 125 advances the processing to step S502 and obtains the BP correction information. The BP correction information is information regarding the image forming position in the imaging optical system with respect to each spatial frequency of a subject. Each of the aforementioned six combinations of the three colors and the two directions is expressed by Equation (13) below, with the spatial frequency f and the position (x, y) of the focus detection region on the image sensor as variables.

$$MTF\_P\_RH(f,x,y) = (rh(0) \times x + rh(1) \times y + rh(2)) \times f^2 + (rh(3) \times x + rh(4) \times y + rh(5)) \times f + (rh(6) \times x + rh(7) \times y + rh(8)) \quad (13)$$

Note that, although Equation (13) is an equation of information MTF_P_RH of the position of the focusing lens 104 at which the defocus MTF with respect to each spatial frequency of a red (R) signal corresponding to the horizontal (H) direction takes its local maximum value, other combinations are also expressed by similar expressions. In the present embodiment, rh(n) (0≤n≤8) is stored in advance in the lens memory 118 in the lens unit 100, and the camera MPU 125 obtains rh(n) (0≤n≤8) by requesting it from the lens MPU 117. However, rh(n) (0≤n≤8) may be stored in the nonvolatile area of the camera RAM 125b.

Coefficients (rv, gh, gv, bh, and bv) in each of the combinations of "red and vertical" (MTF_P_RV), "green and horizontal" (MTF_P_GH), "green and vertical" (MTF_P_GV), "blue and horizontal" (MTF_P_BH), and "blue and vertical" (MTF_P_BV) may also be similarly stored and obtained.

Next, in step S503, the camera MPU 125 performs, with respect to the obtained BP correction information, weighting relating to the position of the focus detection region, the color of an evaluation signal, and the contrast direction. Initially, the camera MPU 125 calculates the BP correction information using the information regarding the position of the focus detection region at the time of calculating the BP correction value.

Specifically, the focus detection region position information is substituted for x and y in Equation (13). With this calculation, Equation (13) is expressed in the form of Equation (14) below.

$$MTF\_P\_RHF = Arh \times f2 + Brh \times f + Crh \qquad (14)$$

The camera MPU 125 also similarly calculates MTF_P_RVF, MTF_P_GHF, MTF_P_GVF, MTF_P_BHF, and MTF_P_BVF. These correspond to defocus MTF intermediate information.

FIG. 16B shows exemplary BP correction information after substituting the focus detection region position information in step S503, with the horizontal and vertical axes respectively indicating the spatial frequency and the position (peak position) of the focusing lens 104 at which the defocus MTF takes its local maximum value. As shown in FIG. 16B, the curves of the respective colors separate from each other when the chromatic aberration is large, and the curves of the horizontal and vertical directions in FIG. 16B separate from each other when the vertical/horizontal difference is large. Thus, in the present embodiment, each combination of the colors (RGB) and the evaluation directions (H and V) has the defocus MTF information corresponding to the respective spatial frequencies. The BP correction value can thereby be accurately calculated.

Next, the camera MPU 125 weights 12 coefficients (FIG. 16A) constituting the setting information obtained in step S500, using the BP correction information. The setting information is thereby weighted in relation to the colors and directions evaluated in focus detection and imaging. Specifically, the camera MPU 125 calculates a spatial frequency characteristic MTF_P_AFF for focus detection and a spatial frequency characteristic MTF_P_IMGF for the photographic image, using Equations (15) and (16).

$$MTF\_P\_AFF = \qquad (15)$$
$$K\_AF\_RH \times MTF\_P\_RHF + K\_AF\_RV \times MTF\_P\_RVF +$$
$$K\_AF\_GH \times MTF\_P\_GHF + K\_AF\_GV \times MTF\_P\_GVF +$$
$$K\_AF\_BH \times MTF\_P\_BHF + K\_AF\_BV \times MTF\_P\_BVF$$

$$MTF\_P\_IMGF = \qquad (16)$$
$$K\_IMG\_RH \times MTF\_P\_RHF + K\_IMG\_RV \times MTF\_P\_RVF +$$
$$K\_IMG\_GH \times MTF\_P\_GHF + K\_IMG\_GV \times MTF\_P\_GVF +$$
$$K\_IMG\_BH \times MTF\_P\_BHF + K\_IMG\_BV \times MTF\_P\_BVF$$

FIG. 16C shows an example of MTF_P_AFF and MTF_P_IMGF in the same form as that in FIG. 16B. In the present embodiment, thus, variables relating to the position of the focus detection region and the evaluated colors and directions are calculated prior to the calculation relating to variables of the spatial frequency. As a result of the calculation, MTF_P_AFF and MTF_P_IMGF are expressed in the forms of Equations (17) and (18) below:

$$MTF\_P\_AFF = Aaf \times f2 + Baf \times f + Caf \qquad (17)$$

$$MTF\_P\_IMGF = Aimg \times f2 + Bimg \times f + Cimg \qquad (18)$$

FIG. 16C shows, on the vertical axis, the focusing lens positions (peak positions) LP4_AF, LP5_AF, LP6_AF, and LP7_AF at which the defocus MTFs obtained by substituting discrete spatial frequencies F1 to F4 in Equation (17) reach their peaks (local maximum values).

In step S504, the camera MPU 125 stores LP4_AF to LP7_AF as a peak coefficient MTF_P_AF(n) (1≤n≤4) in the lens memory 118 or the RAM 125b. The camera MPU 125 also stores LP4 Img to LP7_Img as a peak coefficient MTF_P_Img(n) (1≤n≤4) in the lens memory 118 or the RAM 125b, and advances the processing to step S505.

Next, in step S505, the camera MPU 125 determines whether or not the evaluation band of a signal for focus detection or for the photographic image has been changed, and if not, the camera MPU 125 advances the processing to step S507 and calculates the BP correction value. When calculating the BP correction value, the camera MPU 125 initially calculates the in-focus position (P_img) of the photographic image and the in-focus position (P_AF) detected by the AF, in accordance with Equations (19) and (20), as in the second embodiment. The calculation uses the evaluation bands W1 and W2 obtained in steps S301 and S302 in the first embodiment.

$$P\_img = MTF\_P\_Img(1) \times W1(1) + MTF\_P\_Img(2) \times W1$$
$$(2) + MTF\_P\_Img(3) \times W1(3) + MTF\_P\_Img(4) \times$$
$$W1(4) \qquad (19)$$

$$P\_AF = MTF\_P\_AF(1) \times W2(1) + MTF\_P\_AF(2) \times W2$$
$$(2) + MTF\_P\_AF(3) \times W2(3) + MTF\_P\_AF(4) \times W2$$
$$(4) \qquad (20)$$

That is to say, the camera MPU 125 performs weighted addition on local maximum value information of the defocus MTFs with respect to the respective spatial frequencies shown in FIG. 16C, using the evaluation bands W1 and W2 of the photographic image and the AF calculated in steps S301 and S302 in the first embodiment. The in-focus position (P_img) of the photographic image and the in-focus position (P_AF) detected by the AF are thereby calculated.

Next, the camera MPU 125 calculates the BP correction value (BP) as in the first embodiment, using Equation (21) below.

$$BP = P\_AF - P\_img \qquad (21)$$

On the other hand, if it is determined in step S505 that the evaluation band has been changed, the camera MPU 125 advances the processing to step S506 and obtains evaluation band information. The evaluation band information corresponds to the photographic image evaluation band W1 and the AF evaluation band W2 in the first embodiment, and can be calculated by following the idea described in FIGS. 11A to 11F, in accordance with the settings and the situation of focus detection and the photographic image. In step S506, after finishing obtaining the evaluation band information, the camera MPU 125 advances the processing to step S507 and calculates the BP correction value, as described above.

In the present embodiment, the processing relating to the position of the focus detection region, the color of an evaluation signal, and the contrast direction is executed prior to the processing relating to the evaluation band. This is because, in the case where a photographer determines the position of the focus detection region by the settings, the information regarding the position of the focus detection region and the evaluated colors and directions is not frequently changed. On the other hand, the signal evaluation band is frequently changed by the readout mode of the image sensor, the digital filter for an AF evaluation signal, or the like, as described using FIGS. 11A to 11F in the first embodiment. For example, in a low-illuminance environment where the signal S/N ratio lowers, it is conceivable that the band of the digital filter is changed to a lower band. In the present embodiment, in such a case, the BP correction value is calculated by calculating a coefficient (peak coefficient) that is not frequently changed, thereafter storing the calculated coefficient, and calculating only a coefficient (evaluation band) that is frequently changed, as necessary. The amount of calculation can thereby be reduced in the case where the photographer sets the position of the focus detection region, for example.

Modifications

On the other hand, the cases are also conceivable where BP correction values corresponding to positions of a plurality of focus detection regions are calculated. For example, the cases are conceivable where, at the time of focus detection, focus detection using a plurality of focus detection regions is performed, or where a plurality of defocus amounts within an imaging area are to be obtained in order to create a defocus map.

In this case, calculation relating to the color of an evaluation signal, the contrast direction, and the evaluation band is performed first, and the calculation relating to the position of the focus detection region is performed while changing only the focus detection region position information, and the amount of calculation can thereby be reduced.

Figure 17:
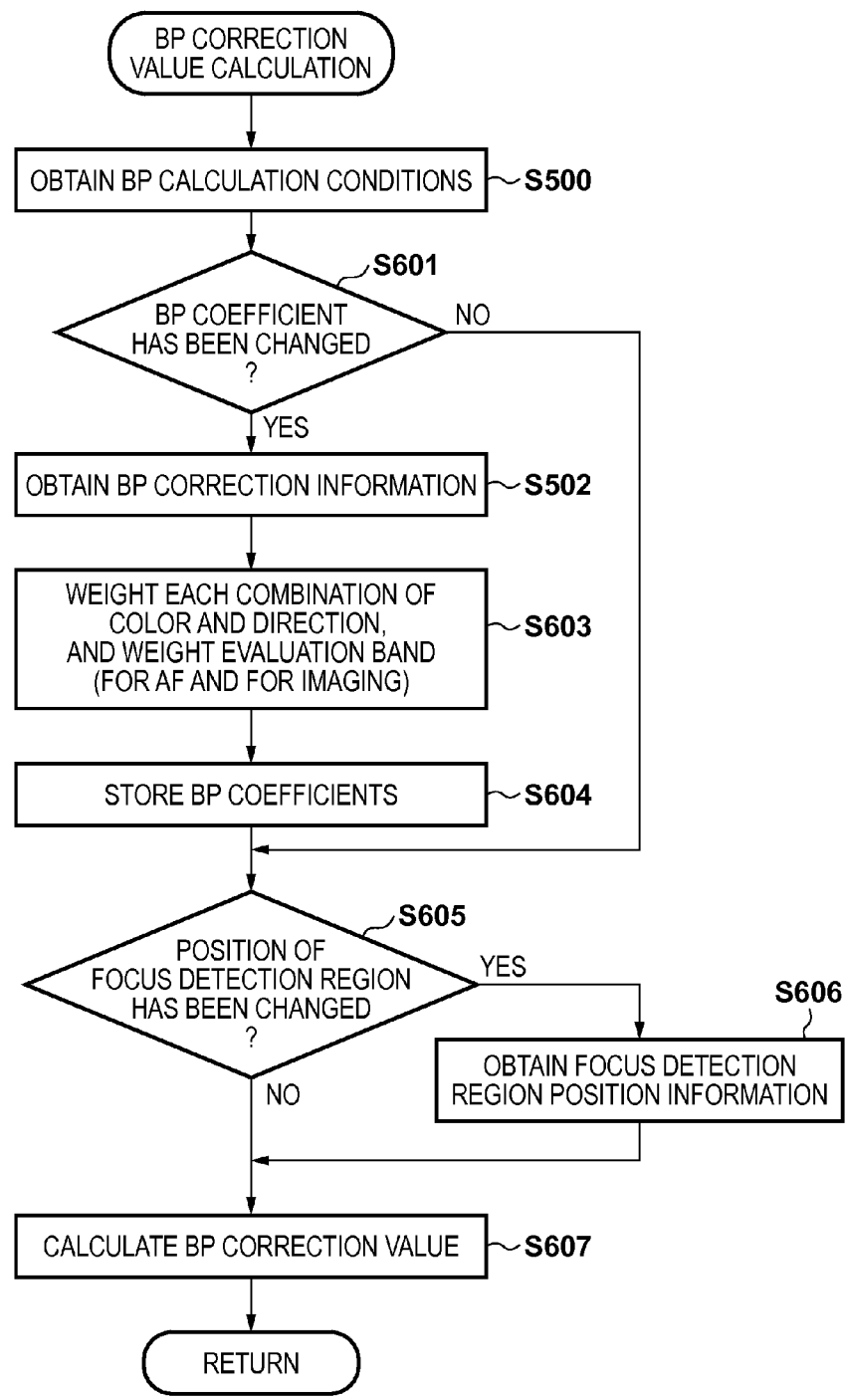
FIG. 17 is a diagram for illustrating a modification of the BP correction value (BP) calculation processing in the fourth embodiment.

FIG. 17 is a flowchart showing another example of the BP correction value calculation processing in step S400 in FIG. 14. Processes of performing processing similar to that in FIG. 15 will be given the same reference numeral, and a redundant description thereof will be omitted.

In step S601, the camera MPU 125 determines whether or not a later-described BP coefficient has been changed. This determination is performed in order to omit recalculation of the BP coefficient, in the case where various conditions are identical in previously-performed BP correction value calculation and the current BP correction value calculation. In the present embodiment, if there has been no change in the setting information (FIG. 16A) regarding the color and evaluation direction for focus detection and the photographic image and the information (evaluation bands W1 and W2) regarding the evaluation band, the camera MPU 125 determines that the BP coefficient has not been changed, and skips the processing to step S605.

If, in step S501, the BP coefficient is calculated for the first time, or if it is determined that the BP coefficient has been changed, the camera MPU 125 advances the processing to step S502, obtains the BP correction information as in the fourth embodiment, and advances the processing to step S603.

In step S603, the camera MPU 125 performs weighting relating to the color and the contrast direction of an evaluation signal on the peak information of six types of the defocus MTF, as described using Equations (14) and (16). However, unlike in step S503, the position information of the focus detection region is not substituted in Equation (14). Accordingly, MTF_P_RH (f, x, y), MTF_P_RV (f, x, y), MTF_P_GH (f, x, y), MTF_P_GV (f, x, y), MTF_P_BH(f, x, y), and MTF_P_BV (f, x, y) are obtained.

The camera MPU 125 then weights 12 coefficients (FIG. 16A) constituting the setting information obtained in step S500, using the above BP correction information. Specifically, the camera MPU 125 calculates a spatial frequency characteristic MTF_P_AF (f, x, y) for focus detection and a spatial frequency characteristic MTF_P_IMG (f, x, y) for the photographic image, using Equations (22) and (23).

$$\begin{aligned}\text{MTF\_P\_AF}(f, x, y) = &\ \text{K\_AF\_RH} \times \text{MTF\_P\_RH}(f, x, y) + \\ &\ \text{K\_AF\_RV} \times \text{MTF\_P\_RV}(f, x, y) + \\ &\ \text{K\_AF\_GH} \times \text{MTF\_P\_GH}(f, x, y) + \\ &\ \text{K\_AF\_GV} \times \text{MTF\_P\_GV}(f, x, y) + \\ &\ \text{K\_AF\_BH} \times \text{MTF\_P\_BH}(f, x, y) + \\ &\ \text{K\_AF\_BV} \times \text{MTF\_P\_BV}(f, x, y)\end{aligned} \quad (22)$$

$$\begin{aligned}\text{MTF\_P\_IMG}(f, x, y) = &\ \text{K\_IMG\_RH} \times \text{MTF\_P\_RH}(f, x, y) + \\ &\ \text{K\_IMG\_RV} \times \text{MTF\_P\_RV}(f, x, y) + \\ &\ \text{K\_IMG\_GH} \times \text{MTF\_P\_GH}(f, x, y) + \\ &\ \text{K\_IMG\_GV} \times \text{MTF\_P\_GV}(f, x, y) + \\ &\ \text{K\_IMG\_BH} \times \text{MTF\_P\_BH}(f, x, y) + \\ &\ \text{K\_IMG\_BV} \times \text{MTF\_P\_BV}(f, x, y)\end{aligned} \quad (23)$$

Furthermore, the camera MPU 125 weights the evaluation band, using the evaluation bands W1 and W2 obtained in steps S301 and S302 in the first embodiment, as with Equations (19) and (20). The in-focus position (P_img) of the photographic image and the in-focus position (P_AF) detected by the AF are thereby obtained as functions with the position (x, y) of the focus detection region as a variable, as expressed by Equations (24) and (25).

$$\begin{aligned}\text{P\_img}(x, y) = &\ \text{MTF\_P\_Img}(F1, x, y) \times W1(1) + \text{MTF\_P\_Img}(F2, x, y) \times W1(2) + \\ &\ \text{MTF\_P\_Img}(F3, x, y) \times W1(3) + \text{MTF\_P\_Img}(F4, x, y) \times W1(4)\end{aligned} \quad (24)$$

$$\begin{aligned}\text{P\_AF}(x, y) = &\ \text{MTF\_P\_AF}(F1, x, y) \times W2(1) + \text{MTF\_P\_AF}(F2, x, y) \times W2(2) + \\ &\ \text{MTF\_P\_AF}(F3, x, y) \times W2(3) + \text{MTF\_P\_AF}(F4, x, y) \times W2(4)\end{aligned} \quad (25)$$

In step S604, the camera MPU 125 stores coefficients constituting Equations (24) and (25) as BP coefficients in the lens memory 118 or the RAM 125b.

Next, in step S605, the camera MPU 125 determines whether or not the position of the focus detection region has been changed, directly advances the processing to step S607 if there has been no change, and if not, the camera MPU 125 obtains the focus detection region position information in step S606 and thereafter advances the processing to step S607.

In step S607, the camera MPU 125 substitutes the position (x1, y1) of the focus detection region in which the BP correction value is to be calculated in Equations (24) and (25), and calculates the BP correction value (BP) in accordance with Equation (26) below.

$$BP = P\_AF(x1, y1) - P\_img(x1, y1) \quad (26)$$

With this configuration, it is possible to perform a reduction of the amount of calculation suitable for the case of calculating the BP correction value corresponding to positions of a plurality of focus detection regions.

The content of the above calculation processing may be switched in accordance with the situation. For example, the processing may be performed as shown in FIG. 15 if one focus detection region is used in focus detection, and the processing may be performed as shown in FIG. 17 if a plurality of focus detection regions are used.

With the above-described configuration, the BP correction value can be calculated while considering the spatial frequency of the color and the vertical/horizontal BP, and correction can be more accurately performed.

Fifth Embodiment

Next, a fifth embodiment of the present invention will be described. The present embodiment is different from the fourth embodiment in the method for calculating the BP correction value. In the fourth embodiment, the BP correction value is calculated based on the premise that the range of the evaluation band of the BP correction information obtained from the imaging optical system is equal to the range of the AF evaluation band and the photographic image evaluation band. However, it is conceivable that, as the pixel pitch of the image sensor becomes finer, the range of the evaluation band is extended to the high frequency band side. It is also conceivable that, with an increase in the accuracy of the imaging optical system, the range of the evaluation band held as the BP correction information is extended to the high frequency band side.

In the present embodiment, in order to accurately calculate the BP correction value, limit band information is provided for each of the image capture apparatus and the imaging optical system, and the correction value calculation processing is switched in accordance with a relationship regarding which is larger or smaller. By adjusting the evaluation band using the limit band information, the BP correction value can be accurately calculated regardless of the combination of the image capture apparatus and the imaging optical system that are new or old.

Note that the block diagram (FIG. 2) of the image capture apparatus, the diagrams (FIGS. 3A to 5) illustrating the focus detection methods, the diagram (FIG. 6) illustrating the focus detection region, the diagrams (FIGS. 11A to 11F) illustrating the evaluated frequency bands, and the focus detection processing (FIG. 14) are common in the present embodiment, and accordingly will also be used in the following description.

A method for calculating the BP correction values (BP) in the present embodiment will now be described using FIGS. 18 and 19A to 19C.

Figure 18:
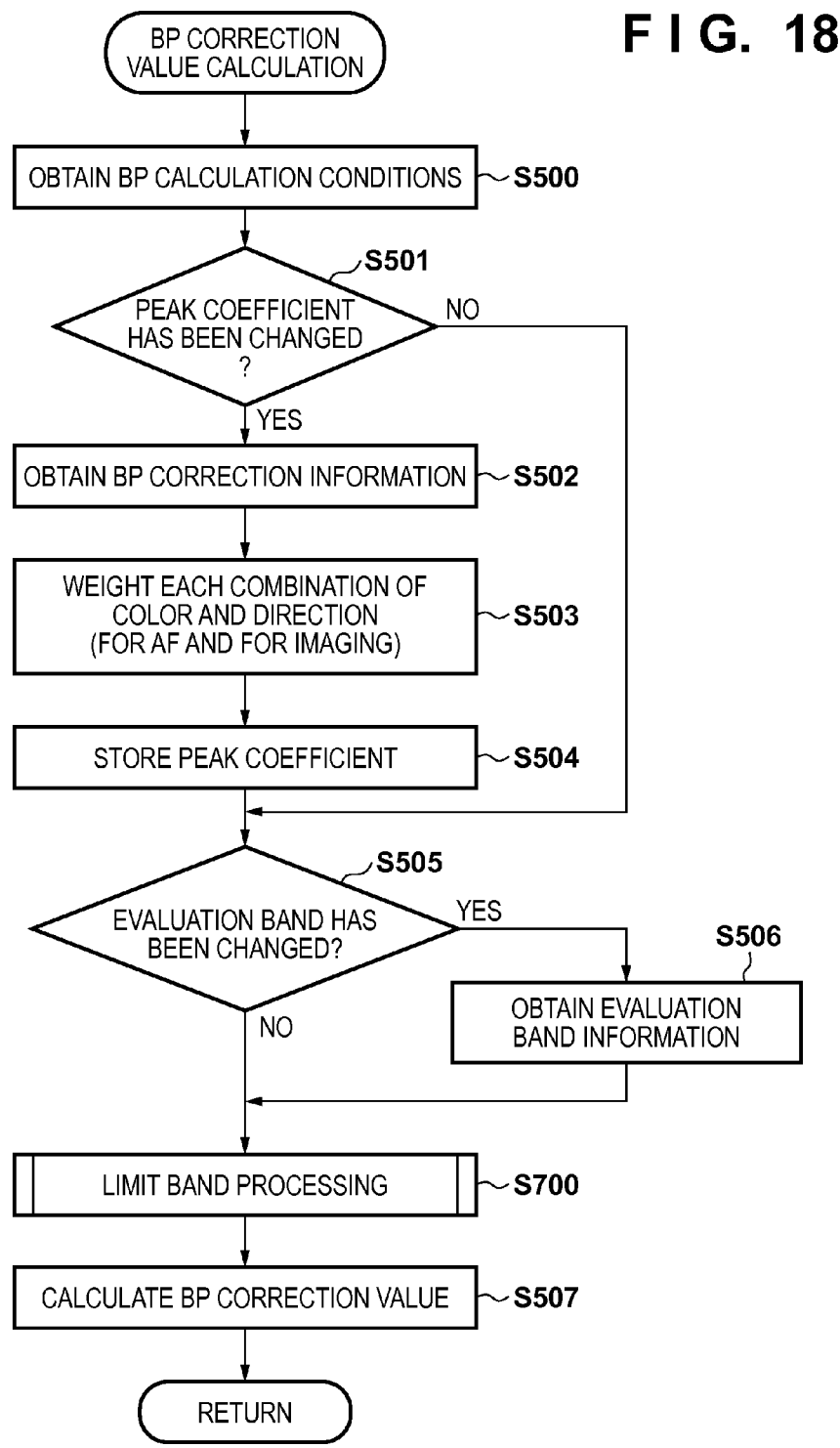
FIG. 18 is a diagram for illustrating BP correction value (BP) calculation processing in a fifth embodiment.

In FIG. 18, steps in which processing similar to the focus detection processing in the fourth embodiment is performed are given the same reference numerals as those in FIG. 15. The present embodiment is different in that the processing includes a step of limit band processing (S700) before the BP correction value calculation processing (S507). In the limit band processing, a relationship is determined regarding which of a limit value (camera limit band) on the high frequency side of the evaluation band of the image capture apparatus and a limit value (lens limit band) on the high frequency side of the evaluation band of the imaging optical system is larger or smaller. Discretization processing for MTF_P_AFF and MTF_P_IMGF expressed by Equations (15) and (16) is switched in accordance with the relationship regarding which is larger or smaller.

Figure 19A:
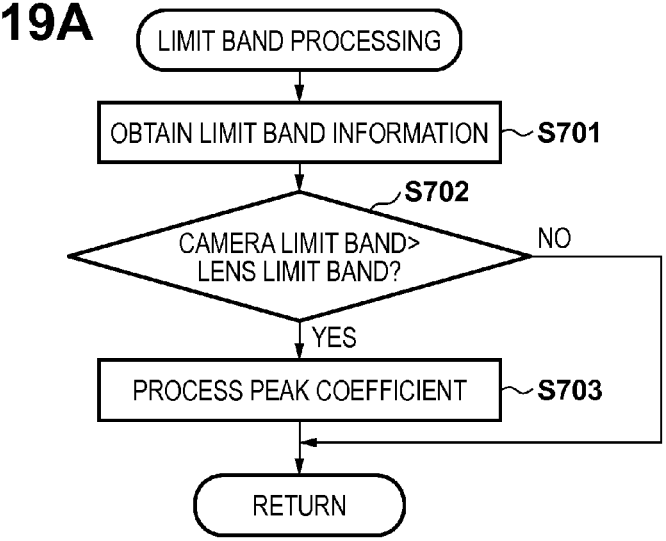
FIGS. 19A to 19C are diagrams for illustrating limit band processing in the fifth embodiment.

The details of the limit band processing performed in step S700 in FIG. 18 will be described below using FIG. 19A.

In step S701, the camera MPU 125 obtains the limit band information. Here, the camera MPU 125 obtains camera limit band information from the ROM 125a, and obtains the lens limit band information from the lens memory 118. The camera limit band is set based on a Nyquist frequency, which is determined mainly by the pixel pitch of the image sensor. On the other hand, as the lens limit band, a limit value of the band with which the response of the MTF of the imaging optical system is larger than or equal to a threshold value, a limit value of the band in which measurement data is reliable, or the like is set.

Next, in step S702, the camera MPU 125 compares the camera limit band with the lens limit band in terms of which is larger or smaller. If the camera limit band is larger (i.e., has a higher limit frequency) than the lens limit band, the camera MPU 125 advances the processing to step S703, and if the camera limit band is smaller than or equal to the lens limit band, the camera MPU 125 ends the limit band processing.

Figure 19B:
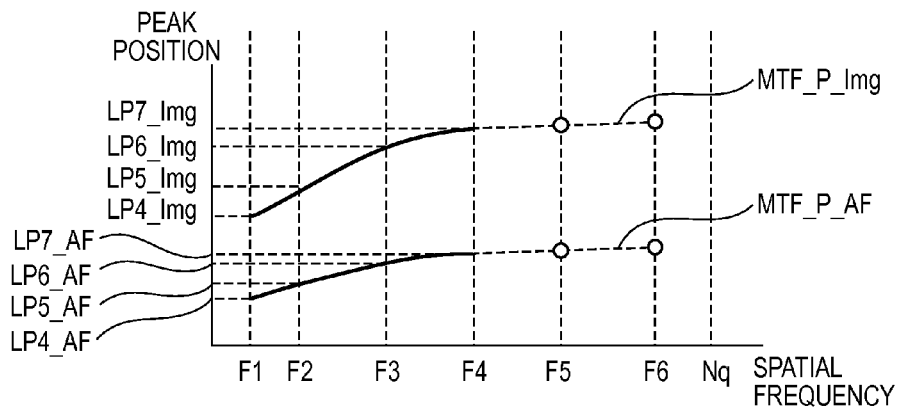

In step S703, the camera MPU 125 manipulates the peak coefficient. An example of manipulation of the peak coefficient will be described using FIG. 19B. FIG. 19B shows MTF_P_AFF and MTF_P_IMGF that are shown in FIG. 16C in the fourth embodiment. It is assumed here that the lens limit band and the camera limit band are F4 and F6, respectively. Nq is the Nyquist frequency determined by the pixel pitch of the image sensor 122, and the camera limit band is set lower than Nq.

MTF_P_AFF is calculated from the BP correction information, and information of the position of the focus detection region and the color and the evaluation direction of an evaluation signal. FIG. 19B shows, on the vertical axis, the focusing lens positions (peak positions) LP4_AF, LP5_AF, LP6_AF, and LP7_AF at which the defocus MTFs obtained by substituting discrete spatial frequencies F1 to F4 in Equation (17) reach their peaks (local maximum values).

Since the lens limit band is F4, the accuracy of the peak position calculated by Equation (17) with respect to a spatial frequency higher than F4 is not guaranteed. For this reason, in the present embodiment, the peak positions LP8_AF and LP9_AF corresponding respectively to spatial frequencies F5 and F6 are calculated from the information of the peak positions corresponding to the spatial frequency F4 and lower spatial frequencies. It is conceivable, as shown in FIG. 19B, the peak value LP7_AF with respect to the spatial frequency F4 is simply used as the peak positions LP8_AF and LP9_AF corresponding to the spatial frequencies F5 and F6. In the case of more accurate calculation, the peak positions LP8_AF and LP9_AF may be obtained by extrapolation calculation using information of a plurality of peak positions (LP4_AF, LP5_AF, LP6_AF, LP7_AF) corresponding to the spatial frequency F4 and lower spatial frequencies.

Regarding MTF_P_IMGF as well, peak positions LP8_Img and LP9_Img corresponding to the spatial frequencies F5 and F6 are calculated by performing similar processing. FIG. 19B shows an example of using the peak value LP7_Img with respect to the spatial frequency F4 also as the peak positions LP8_Img and LP9_Img corresponding to the spatial frequencies F5 and F6.

In step S703, the camera MPU 125 stores, as the peak coefficients, LP4_AF to LP7_AF, LP8_AF, and LP9_AF as MTF_P_AF(n) (1≤n≤6) in the lens memory 118 or the RAM 125b. Similarly, the camera MPU 125 stores LP4_Img to LP7_Img, LP8_Img, and LP9_Img as MTF_P_Img(n) (1≤n≤6) in the lens memory 118 or the RAM 125b, and ends the limit band processing.

The camera MPU 125 also calculates the BP correction value as with Equations (19) to (21), using the information of the spatial frequency F6, which is the camera limit band, and lower spatial frequencies as the AF evaluation band and the photographic image evaluation band.

Figure 19C:
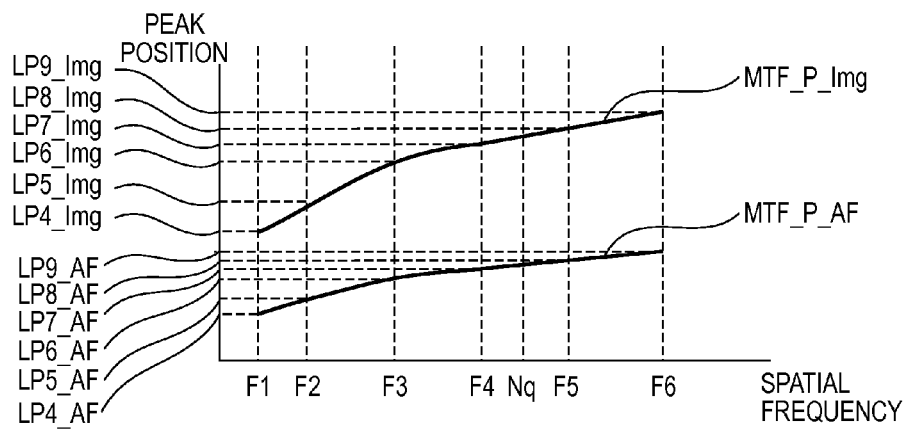

As described above, if, in step S702, the camera limit band is smaller than or equal to the lens limit band, the limit band processing is terminated without performing the processing for manipulating the peak coefficient in step S703. A reason why the processing for manipulating the peak coefficient may be omitted will now be described using FIG. 19C. FIG. 19C shows an example of MTF_P_AFF and MTF_P_IMGF in the case where the camera limit band is smaller than or equal to the lens limit band, with respect to a band similar to that in FIG. 19B. It is assumed here that the camera limit band and the lens limit band are F4 and F6, respectively. As mentioned above, the camera limit band is set lower than the Nyquist frequency Nq.

In the case of omitting processing for manipulating the peak coefficient, information of the peak position relating to the imaging optical system excessively exists with respect to the evaluation area, since the camera limit band is smaller than or equal to the lens limit band. On the other hand, the AF evaluation band and the photographic image evaluation band described using FIGS. 11A to 11F are calculated in a band smaller than or equal to the camera limit band. In the present embodiment, if the camera limit band is smaller than or equal to the lens limit band, the BP correction value is calculated without using information of the peak position corresponding to a spatial frequency higher than the camera limit band. Since the camera limit band is set lower than the Nyquist frequency Nq determined by the pixel pitch of the image sensor, the information regarding a band larger than or equal to the camera limit band is lost in sampling by the pixels. For this reason, the accuracy of the BP correction value calculation is maintained even if the above processing is performed.

Although the present embodiment has described the case of using the information of the peak positions (focusing lens position at which the defocus MTFs reach their peaks) based on the fourth embodiment, the information of an aberration of the imaging optical system is not limited thereto. For example, a defocus MTF shape that is out of a handleable range may be calculated using the defocus MTF information described in the first embodiment.

As described above, in the present embodiment, if the camera limit band is higher than the lens limit band, the number of discrete frequencies indicating the spatial frequency characteristics for the autofocus and for the photographic image is increased in accordance with the camera limit band. For this reason, the BP correction value can be accurately calculated regardless of the combination of the image capture apparatus and the imaging optical system.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2014-094877, filed May 1, 2014, and 2014-169803, filed Aug. 22, 2014, which are hereby incorporated by reference herein in their entirety.

What is claimed is:

1. A focus adjustment device capable of executing autofocus by at least one of a phase-difference detection method and a contrast detection method, the device comprising:
   an obtaining unit configured to obtain a correction value by calculating an evaluation band of a focus detection signal used in executing the autofocus;
   calculating an evaluation band of an image signal to be captured
   calculating in-focus positions of an imaging optical system for the image signal and for the focus detection signal based on (i) information regarding spherical aberration, chromatic aberration, and astigmatism of the imaging optical system and (ii) setting information regarding the evaluation bands of the captured image signals and the focus detection signals, and
   calculating a difference between the in-focus position for the captured image signal and the in-focus position for the focus detection signal as the correction value for correcting a result of the autofocus; and
   a control unit configured to control a position of a focusing lens that the imaging optical system has, based on the result of the autofocus corrected using the correction value,
   wherein information regarding positions of a focusing lens of the imaging optical system respectively correspond to different spatial frequencies is used as the information regarding spherical aberration, chromatic aberration, and astigmatism of the imaging optical system,
   wherein the information regarding the positions of the focusing lens is represented by a function having a first parameter and a second parameter as its variables, and
   wherein the calculating the in-focus positions comprises:
   calculating intermediate information based on the information regarding the positions of the focusing lens and the first parameter; and calculating the in-focus position for the captured image signal and the in-focus position for the focus detection signal based on the intermediate information and the second parameter.

2. The focus adjustment device according to claim 1, where the obtaining unit is located in a camera unit.

3. The focus adjustment device according to claim 1, wherein the obtaining unit is located in a lens unit.

4. The focus adjustment device according to claim 1, wherein the first parameter a variable corresponding to the chromatic aberration and the astigmatism of the imaging optical system, and a position of a focus detection area to which the autofocus is executed, and
wherein the second parameter is a variable corresponding to the spherical aberration of the imaging optical system.

5. The focus adjustment device according to claim 1, wherein the first parameter is a variable corresponding to the chromatic aberration, the astigmatism, and the spherical aberration of the imaging optical system, and
wherein the second parameter is a variable corresponding to a position of a focus detection area to which the autofocus is executed.

6. The focus adjustment device according to claim 1, the information regarding the positions of the focusing lens of the imaging optical system respectively correspond to different spatial frequencies is information of a plurality of positions of the focusing lens that respectively correspond to maximum values of defocus MTFs respectively corresponding to the different spatial frequencies.

7. A focus adjustment method for adjusting an autofocus position of a focusing lens obtained by executing autofocus by at least one of a phase-difference detection method and a contrast detection method, the method comprising:
calculating an evaluation band of a focus detection signal used in executing the autofocus;
calculating an evaluation band of an image signal to be captured;
calculating in-focus positions of an imaging optical system for the image signal and for the focus detection signal based on (i) information regarding spherical aberration, chromatic aberration, and astigmatism of the imaging optical system and (ii) setting information regarding the evaluation bands of the captured image signals and the focus detection signals, respectively, and
calculating a difference between the in-focus position for the captured image signal and the in-focus position for the focus detection signal as a correction value for correcting a result of the autofocus; and
controlling a position of the focusing lens that the imaging optical system has, based on the result of the autofocus corrected using the correction value,
wherein information regarding positions of the focusing lens respectively correspond to different spatial frequencies is used as the information regarding spherical aberration, chromatic aberration, and astigmatism of the imaging optical system,
wherein the information regarding the positions of the focusing lens represented by a function having a first parameter and a second parameter as its variables, and
wherein the calculating the in-focus positions comprises:
calculating intermediate information based on the information regarding the positions of the focusing lens and the first parameter; and
calculating the in-focus position for the captured image signal and the in-focus position for the focus detection signal based on the intermediate information and the second parameter.

8. A non-transitory readable storage medium having stored thereon a program which is executable by a computer, the program having a program code for realizing a focus adjustment method for adjusting an autofocus position of a focusing lens obtained by executing autofocus by at least one of a phase-difference detection method and a contrast detection method, the method comprising:
calculating an evaluation band of a focus detection signal used in executing the autofocus;
calculating an evaluation band of an image signal to be captured;
calculating in-focus positions of an imaging optical system for the image signal and for the focus detection signal based on (i) information regarding spherical aberration, chromatic aberration, and astigmatism of the imaging optical system and (ii) setting information regarding the evaluation bands of the captured image signals and the focus detection signals, respectively, and
calculating a difference between the in-focus position for the captured image signal and the in-focus position for the focus detection signal as a correction value for correcting a result of the autofocus; and
controlling a position of the focusing lens that the imaging optical system has, based on the result of the autofocus corrected using the correction value,
wherein information regarding positions of the focusing lens respectively correspond to different spatial frequencies is used as the information regarding spherical aberration, chromatic aberration, and astigmatism of the imaging optical system,
wherein the information regarding the positions of the focusing lens is represented by a function having a first parameter and a second parameter as its variables, and
wherein the calculating the in-focus positions comprises:
calculating intermediate information based on the information regarding the positions of the focusing lens and the first parameter; and
calculating the in-focus position for the captured image signal and the in-focus position for the focus detection signal based on the intermediate information and the second parameter.

9. A focus adjustment device capable of executing autofocus by at least one of a phase-difference detection method and a contrast detection method, the device comprising:
an obtaining unit configured to obtain a correction value based on an evaluation band of a focus detection signal used in executing the autofocus, an evaluation band of an image signal to be captured, and information on aberrations of the imaging optical system;
a correction unit configured to correct a focus detection result by using the correction value; and
a control unit configured to control a position of focusing lens that the imaging optical system has, based on the result of the autofocus corrected using the correction value,
wherein the information on aberrations comprises (i) first band information that corresponds at least one of astigmatism, chromatic aberration, and spherical aberration of the imaging optical system and (ii) aberration information corresponding to the first band information, and wherein the obtaining unit (i) calculates aberration information corresponding to a band that is within second band corresponding to the evaluation band of the focus detection signal used in executing the autofocus, and is without the first band, based on the first band information and the aberration information corresponding to the first band information, and (ii) obtains the correction value based on the evaluation band of a focus detection signal used in executing the autofocus, the evaluation band of an image signal to be captured, and the calculated aberration information.

10. The focus adjustment device according to claim 9, further comprises a determination unit configured to determine magnitude relationship between the first band and the second band, wherein if it is determined that the second band is larger than the first band, the obtaining unit calculates the aberration information corresponding to the band that is within the second band and is without the first band.

11. The focus adjustment device according to claim 9, wherein the first band is a band for which a response of an MTF of the imaging optical system is not less than a threshold value or a band of which data being reliable.

12. The focus adjustment device according to claim 9, wherein the second band is based on a Nyquist frequency, which is determined by the pixel pitch of an image sensor.

13. A focus adjustment method for adjusting an autofocus position of a focusing lens obtained by executing autofocus by at least one of a phase-difference detection method and a contrast detection method, the method comprising:

obtaining a correction value based on an evaluation band of a focus detection signal used in executing the autofocus, an evaluation band of an image signal to be captured, and information on aberrations of the imaging optical system;

correcting a focus detection result by using the correction value; and controlling a position of the focusing lens that an imaging optical system has, based on the result of the autofocus corrected using the correction value, wherein the information on aberrations comprises (i) first band information that corresponds to at least one of astigmatism, chromatic aberration, and spherical aberration of the imaging optical system and (ii) aberration information corresponding to the first band information, and wherein the obtaining (i) calculates aberration information corresponding to a band that is within a second band corresponding to the evaluation band of the focus detection signal used in executing the autofocus, and is without the first bared, based n the first band information and the aberration information corresponding to the first band information, and (ii) obtains the correction value based on the evaluation band of a focus detection signal used in executing the autofocus, the evaluation band of an image signal to be captured, and the calculated aberration information.

14. A non-transitory readable storage medium having stored thereon a program which is executable by a computer, the program having a program code for realizing a focus adjustment method for adjusting an autofocus position of a focusing obtained by executing autofocus by at least one of a phase-difference detection method and a contrast detection method, the method comprising:

obtaining a correction value based on an evaluation band of a focus detection signal used in executing the autofocus, an evaluation band of are image signal to be captured, and information on aberrations of the imaging optical system;

correcting a focus detection result by using the correction value; and controlling a position of the focusing lens that an imaging optical system has, based on the result of the autofocus corrected using the correction value, wherein the information on aberrations comprises (i) first band information that corresponds to at least one of astigmatism, chromatic aberration, and spherical aberration of the imaging optical system and (ii) aberration is information corresponding to the first band information, and wherein the obtaining (i) calculates aberration information corresponding to a band that is within a second band corresponding the evaluation band of the focus detection signal used in executing the autofocus, and is without the first band, based on the first band information and the aberration information corresponding information to the first band information, and (ii) obtains the correction value based on the evaluation band of a focus detection signal used in executing the autofocus, the evaluation band of an image signal to be captured, and the calculated aberration information.

* * * * *